(12) United States Patent
Zaki et al.

(10) Patent No.: US 11,272,496 B2
(45) Date of Patent: Mar. 8, 2022

(54) NARROWBAND RETUNING IN WIRELESS COMMUNICATIONS

(71) Applicant: QUALCOMM Incorporated, San Diego, CA (US)

(72) Inventors: Ahmed Zaki, Bengaluru (IN); Ravinder Kumar, Meham (IN); Vijayvaradharaj Tirucherai Muralidharan, Santa Clara, CA (US); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/780,358

(22) Filed: Feb. 3, 2020

(65) Prior Publication Data

US 2021/0243730 A1    Aug. 5, 2021

(51) Int. Cl.
| | |
|---|---|
| *H04W 72/04* | (2009.01) |
| *H04W 8/24* | (2009.01) |
| *H04L 1/00* | (2006.01) |
| *H04L 1/18* | (2006.01) |
| *H04B 17/336* | (2015.01) |
| *H04B 7/01* | (2006.01) |
| *H04L 5/00* | (2006.01) |
| *H04W 24/08* | (2009.01) |

(52) U.S. Cl.
CPC ............ *H04W 72/042* (2013.01); *H04B 7/01* (2013.01); *H04B 17/336* (2015.01); *H04L 1/0013* (2013.01); *H04L 1/1819* (2013.01); *H04L 5/0051* (2013.01); *H04W 8/24* (2013.01); *H04W 24/08* (2013.01); *H04W 72/0446* (2013.01); *H04W 72/0453* (2013.01)

(58) Field of Classification Search
CPC .......... H04W 72/0453; H04W 72/042; H04W 72/0446; H04W 24/08; H04W 8/24; H04L 1/0013; H04L 1/1819; H04L 5/0051; H04B 17/336; H04B 7/01
See application file for complete search history.

(56) References Cited

U.S. PATENT DOCUMENTS

| | | | |
|---|---|---|---|
| 10,075,851 B1* | 9/2018 | Marupaduga | H04W 16/14 |
| 2006/0229068 A1 | 10/2006 | Niemela et al. | |
| 2013/0294318 A1 | 11/2013 | Amerga et al. | |
| 2015/0011236 A1* | 1/2015 | Kazmi | G01S 5/0226 455/456.1 |
| 2021/0075689 A1* | 3/2021 | Ramanathan | H04L 41/147 |

* cited by examiner

*Primary Examiner* — Wei Zhao
(74) *Attorney, Agent, or Firm* — QUALCOMM Incorporated

(57) ABSTRACT

Methods, systems, and devices for wireless communications are described. A user equipment (UE) may retune from a first narrowband carrier to a second narrowband carrier. The UE may determine to retune in one or more symbols of either a first narrowband subframe or a second narrowband subframe based on the number of symbols for the UE to retune and a number of other factors. The other factors may include the start symbol of a downlink channel scheduled in the second narrowband subframe, the number of antenna ports configured for the UE, hybrid automatic repeat request (HARQ) identifier (ID), coding rate or effective coding rate, among others. The UE may determine to retune in the first narrowband subframe, the second narrowband subframe, or in both subframes in order to utilize reference signals transmitted to the UE and reception of all downlink messages scheduled for the UE.

30 Claims, 19 Drawing Sheets

NARROWBAND RETUNING IN WIRELESS COMMUNICATIONS

FIELD OF TECHNOLOGY

The following relates generally to wireless communications and more specifically to narrowband retuning in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may hop between narrowband carriers during communications with other wireless devices. While hopping from one narrowband carrier to another, the UE may perform retuning. Retuning over a number of symbols may cause a loss of downlink channels in the symbols used for retuning.

SUMMARY

The described techniques relate to improved methods, systems, devices, and apparatuses that support narrowband retuning in wireless communications. Generally, the described techniques provide for retuning from a first narrowband carrier to a second narrowband carrier by a user equipment (UE). The UE may determine to retune in one or more symbols of either a first narrowband subframe or a second narrowband subframe based on the number of symbols for retuning by the UE and a number of other factors. The other factors may include the start symbol of a downlink channel scheduled in the second narrowband subframe, the number of antenna ports configured for the UE, hybrid automatic repeat request (HARQ) identifier (ID), coding rate or effective coding rate, among others. The UE may determine to retune in the first narrowband subframe, the second narrowband subframe, or in both subframes in order to optimize the use of reference signals transmitted to the UE and reception of all downlink messages scheduled for the UE.

A method of wireless communications at a UE is described. The method may include receiving, over a first carrier, a first downlink channel in a first subframe, identifying a second carrier and a start symbol for a second downlink channel in a second subframe adjacent the first subframe in time, determining a start time to perform retuning from the first carrier to the second carrier based on a capability of the UE and the start symbol for the second downlink channel, retuning from the first carrier to the second carrier at the start time, and monitoring the second carrier for the second downlink channel after retuning.

An apparatus for wireless communications at a UE is described. The apparatus may include a processor, memory coupled with the processor, and instructions stored in the memory. The instructions may be executable by the processor to cause the apparatus to receive, over a first carrier, a first downlink channel in a first subframe, identify a second carrier and a start symbol for a second downlink channel in a second subframe adjacent the first subframe in time, determine a start time to perform retuning from the first carrier to the second carrier based on a capability of the UE and the start symbol for the second downlink channel, retune from the first carrier to the second carrier at the start time, and monitor the second carrier for the second downlink channel after retuning.

Another apparatus for wireless communications at a UE is described. The apparatus may include means for receiving, over a first carrier, a first downlink channel in a first subframe, identifying a second carrier and a start symbol for a second downlink channel in a second subframe adjacent the first subframe in time, determining a start time to perform retuning from the first carrier to the second carrier based on a capability of the UE and the start symbol for the second downlink channel, retuning from the first carrier to the second carrier at the start time, and monitoring the second carrier for the second downlink channel after retuning.

A non-transitory computer-readable medium storing code for wireless communications at a UE is described. The code may include instructions executable by a processor to receive, over a first carrier, a first downlink channel in a first subframe, identify a second carrier and a start symbol for a second downlink channel in a second subframe adjacent the first subframe in time, determine a start time to perform retuning from the first carrier to the second carrier based on a capability of the UE and the start symbol for the second downlink channel, retune from the first carrier to the second carrier at the start time, and monitor the second carrier for the second downlink channel after retuning.

Some examples of the method, apparatuses, and non-transitory computer-readable medium described herein may further include operations, features, means, or instructions for determining the start time to perform retuning based on a number of symbols for UE retuning, a number of antenna ports configured for the UE, or any combination thereof.

Some examples of the method, apparatuses, and non-transitory computer-readable medium described herein may further include operations, features, means, or instructions for determining the number of symbols for UE retuning based on the capability of the UE.

Some examples of the method, apparatuses, and non-transitory computer-readable medium described herein may further include operations, features, means, or instructions for determining the start time to perform retuning based on a HARQ ID, a retransmission number, an effective coding rate for the first downlink channel or the second downlink channel, a signal to noise ratio, a Doppler effect, a channel type of the first downlink channel or the second downlink channel, or any combination thereof.

Some examples of the method, apparatuses, and non-transitory computer-readable medium described herein may further include operations, features, means, or instructions for retuning from the first carrier to the second carrier prior to the start symbol for the second downlink channel.

Some examples of the method, apparatuses, and non-transitory computer-readable medium described herein may further include operations, features, means, or instructions for receiving a reference signal in an initial symbol of the second subframe, and retuning from the first carrier to the second carrier after reception of the reference signal.

Some examples of the method, apparatuses, and non-transitory computer-readable medium described herein may further include operations, features, means, or instructions for performing a channel interpolation for one or more symbols before the initial symbol using the received reference signal.

Some examples of the method, apparatuses, and non-transitory computer-readable medium described herein may further include operations, features, means, or instructions for retuning may be performed during one or more symbols and the one or more symbols may be located in the first subframe.

Some examples of the method, apparatuses, and non-transitory computer-readable medium described herein may further include operations, features, means, or instructions for retuning may be performed during one or more symbols and the one or more symbols may be located in the second subframe.

Some examples of the method, apparatuses, and non-transitory computer-readable medium described herein may further include operations, features, means, or instructions for retuning may be performed during one or more symbols and the one or more symbols span at least a portion of both the first subframe and the second subframe.

Some examples of the method, apparatuses, and non-transitory computer-readable medium described herein may further include operations, features, means, or instructions for determining to puncture at least one symbol of the first subframe or the second subframe to perform retuning based on the capability of the UE and the start symbol of the second downlink channel.

Some examples of the method, apparatuses, and non-transitory computer-readable medium described herein may further include operations, features, means, or instructions for determining the at least one symbol based on a code rate or a retransmission identifier associated with the second downlink channel.

Some examples of the method, apparatuses, and non-transitory computer-readable medium described herein may further include operations, features, means, or instructions for retuning from the first carrier to the second carrier at a boundary between two symbols in the second subframe.

A method of wireless communications at a UE is described. The method may include receiving, over a first carrier, a first downlink channel in a first subframe, identifying a second carrier and a start symbol for a second downlink channel in a second subframe adjacent the first subframe in time, determining a start time to perform retuning from the first carrier to the second carrier based on a capability of the UE and the start symbol for the second downlink channel, retuning from the first carrier to the second carrier at the start time, and monitoring the second carrier for the second downlink channel after retuning.

An apparatus for wireless communications at a UE is described. The apparatus may include a processor, memory coupled with the processor, and instructions stored in the memory. The instructions may be executable by the processor to cause the apparatus to receive, over a first carrier, a first downlink channel in a first subframe, identify a second carrier and a start symbol for a second downlink channel in a second subframe adjacent the first subframe in time, determine a start time to perform retuning from the first carrier to the second carrier based on a capability of the UE and the start symbol for the second downlink channel, retune from the first carrier to the second carrier at the start time, and monitor the second carrier for the second downlink channel after retuning.

Another apparatus for wireless communications at a UE is described. The apparatus may include means for receiving, over a first carrier, a first downlink channel in a first subframe, identifying a second carrier and a start symbol for a second downlink channel in a second subframe adjacent the first subframe in time, determining a start time to perform retuning from the first carrier to the second carrier based on a capability of the UE and the start symbol for the second downlink channel, retuning from the first carrier to the second carrier at the start time, and monitoring the second carrier for the second downlink channel after retuning.

A non-transitory computer-readable medium storing code for wireless communications at a UE is described. The code may include instructions executable by a processor to receive, over a first carrier, a first downlink channel in a first subframe, identify a second carrier and a start symbol for a second downlink channel in a second subframe adjacent the first subframe in time, determine a start time to perform retuning from the first carrier to the second carrier based on a capability of the UE and the start symbol for the second downlink channel, retune from the first carrier to the second carrier at the start time, and monitor the second carrier for the second downlink channel after retuning.

Some examples of the method, apparatuses, and non-transitory computer-readable medium described herein may further include operations, features, means, or instructions for determining the start time to perform retuning based on a number of symbols for UE retuning, a number of antenna ports configured for the UE, or any combination thereof.

Some examples of the method, apparatuses, and non-transitory computer-readable medium described herein may further include operations, features, means, or instructions for determining the number of symbols for UE retuning based on the capability of the UE.

Some examples of the method, apparatuses, and non-transitory computer-readable medium described herein may further include operations, features, means, or instructions for determining the start time to perform retuning based on a HARQ ID, a retransmission number, an effective coding rate for the first downlink channel or the second downlink channel, a signal to noise ratio, a Doppler effect, a channel type of the first downlink channel or the second downlink channel, or any combination thereof.

Some examples of the method, apparatuses, and non-transitory computer-readable medium described herein may further include operations, features, means, or instructions for retuning from the first carrier to the second carrier prior to the start symbol for the second downlink channel.

Some examples of the method, apparatuses, and non-transitory computer-readable medium described herein may further include operations, features, means, or instructions for receiving a reference signal in an initial symbol of the second subframe, and retuning from the first carrier to the second carrier after reception of the reference signal.

Some examples of the method, apparatuses, and non-transitory computer-readable medium described herein may further include operations, features, means, or instructions for performing a channel interpolation for one or more symbols before the initial symbol using the received reference signal.

Some examples of the method, apparatuses, and non-transitory computer-readable medium described herein may further include operations, features, means, or instructions for retuning may be performed during one or more symbols and the one or more symbols may be located in the first subframe.

Some examples of the method, apparatuses, and non-transitory computer-readable medium described herein may further include operations, features, means, or instructions for retuning may be performed during one or more symbols and the one or more symbols may be located in the second subframe.

Some examples of the method, apparatuses, and non-transitory computer-readable medium described herein may further include operations, features, means, or instructions for retuning may be performed during one or more symbols and the one or more symbols span at least a portion of both the first subframe and the second subframe.

Some examples of the method, apparatuses, and non-transitory computer-readable medium described herein may further include operations, features, means, or instructions for determining to puncture at least one symbol of the first subframe or the second subframe to perform retuning based on the capability of the UE and the start symbol of the second downlink channel.

Some examples of the method, apparatuses, and non-transitory computer-readable medium described herein may further include operations, features, means, or instructions for determining the at least one symbol based on a code rate or a retransmission identifier associated with the second downlink channel.

Some examples of the method, apparatuses, and non-transitory computer-readable medium described herein may further include operations, features, means, or instructions for retuning from the first carrier to the second carrier at a boundary between two symbols in the second subframe.

DETAILED DESCRIPTION

Figure 1:
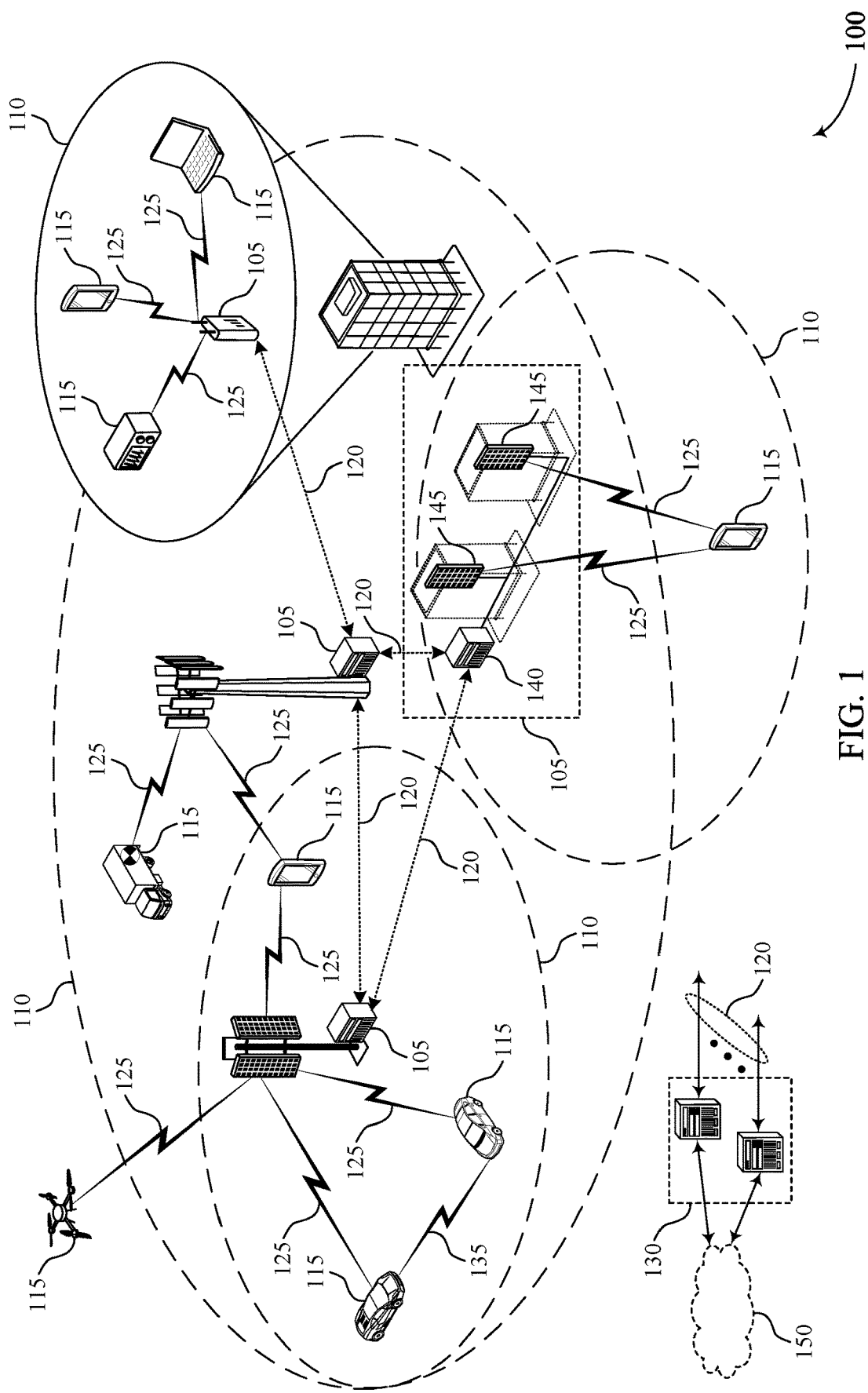
FIG. 1 illustrates an example of a wireless communications system that supports narrowband retuning in wireless communications in accordance with aspects of the present disclosure.

A base station may signal a user equipment (UE) to perform narrowband hopping between a subframe in a first narrowband frequency to a subframe in a second narrowband frequency. The base station may signal to the UE between physical downlink shared channel (PDSCH) repetitions, across different PDSCH hybrid automatic repeat request (HARQ) identifiers (IDs), or between machine type communications (MTC) physical downlink control channel (MPDCCH) repetitions. During narrowband hopping, channel estimation may have to refresh and there may be discontinuity in channel estimates for the ending symbols in the previous narrowband. In some examples, the first cell reference signal (CRS) (e.g., pilots used for channel estimation) symbol in the second narrowband subframe may be lost in current implementations due to the UE performing retuning in the first symbol of the second narrowband subframe.

The UE may use, based on UE capability, symbol 0, 1, or 2 of the 14 symbols in a narrowband subframe for retuning. In some cases, when the UE uses one symbol to retune, the UE may lose the CRS in that symbol, corresponding to the first or second antenna ports, in the symbol 0 of the narrowband. For example, when the UE retunes in symbol 0 containing the CRS for the first or second antenna ports, the next available CRS may be located in symbol 4. In other cases, when the UE uses two symbols to retune, the UE may lose the CRS symbols, corresponding to the first and second antenna ports and the third and fourth antenna ports, in symbol 1 of the narrowband subframe.

In accordance with aspects of the present disclosure, the UE may optimize narrowband hopping by determining to retune in one or more symbols of either a first narrowband subframe or a second narrowband subframe based on the number of symbols for retuning, the start symbol of the PDSCH, the number of antenna ports, the HARQ ID, the retransmission number, effective coding rate with retune symbol nulling, signal to noise ratio (SNR) and Doppler effect, or the channel type (e.g., MPDCCH or PDSCH). The UE may use available symbols (e.g., symbols not containing PDSCHs or a CRS) for retuning to avoid symbols containing a CRS. In some cases, the UE may retune at the boundary between two symbols or the UE may retune in one or more symbols. In other cases, the UE may puncture symbols containing a PDSCH to allow for retuning in those symbols.

Particular aspects of the subject matter described herein may be implemented to realize one or more advantages. The described techniques may support improvements in retuning between narrowband carriers, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Additionally, aspects of the disclosure are illustrated through an additional wireless communications system, retuning configurations, and a process flow. Aspects of the disclosure are further illustrated by and described with reference to apparatus diagrams, system diagrams, and flowcharts that relate to narrowband retuning in wireless communications.

FIG. 1 illustrates an example of a wireless communications system 100 that supports narrowband retuning in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARID)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UE 115 may retune from a first narrowband carrier to a second narrowband carrier. The UE 115 may determine to retune in one or more symbols of either a first narrowband subframe or a second narrowband subframe based on the number of symbols for the UE to retune and a number of other factors. The other factors may include the start symbol of a downlink channel scheduled in the second narrowband subframe, the number of antenna ports configured for the UE 115, HARQ ID, coding rate or effective coding rate, among others. The UE 115 may determine to retune in the first narrowband subframe, the second narrowband subframe, or in both subframes in order to optimize the use of reference signals transmitted to the UE 115 and reception of all downlink messages scheduled for the UE 115.

Figure 2:
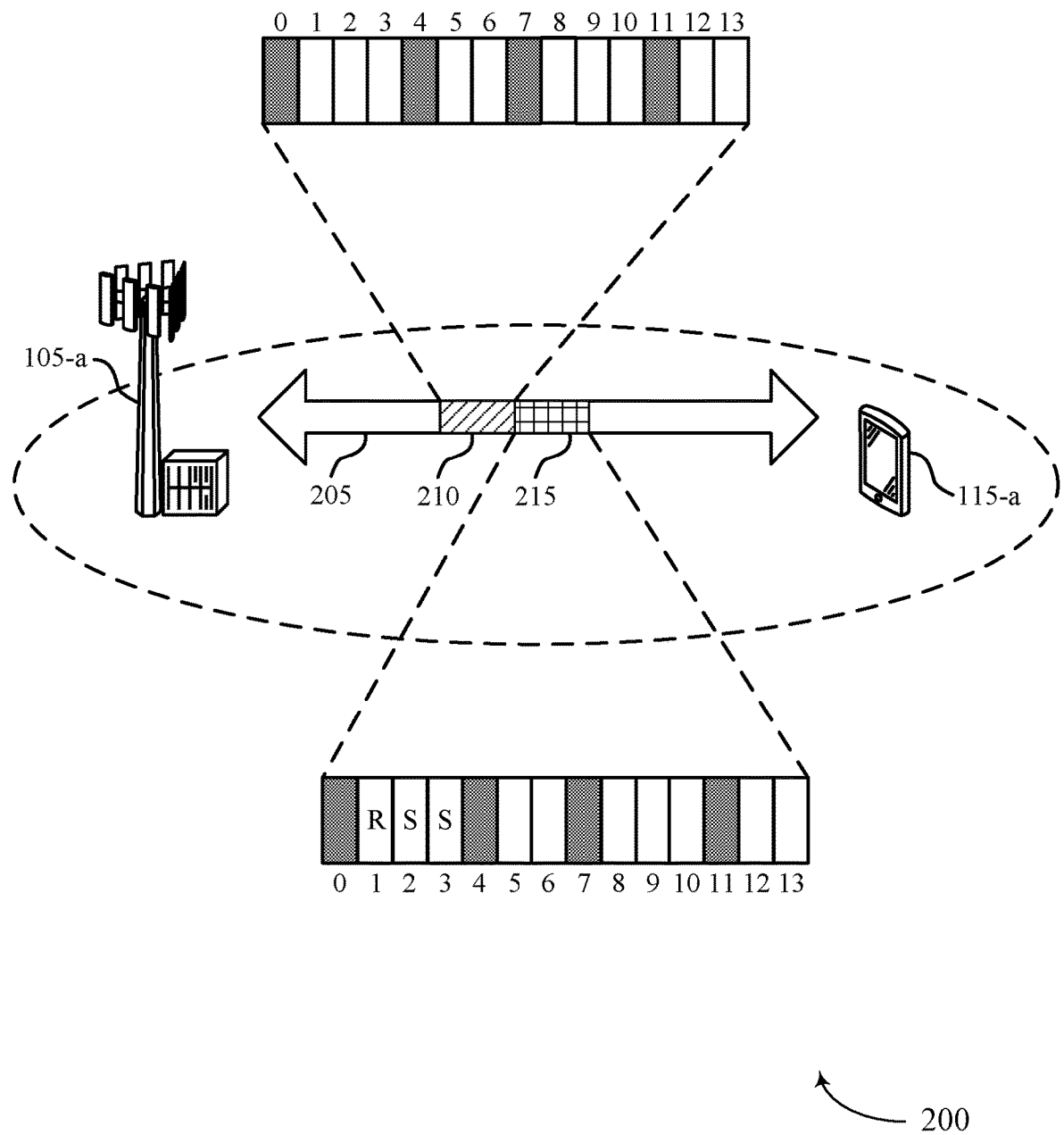
FIG. 2 illustrates an example of a wireless communications system that supports narrowband retuning in wireless communications in accordance with aspects of the present disclosure.

FIG. 2 illustrates an example of a wireless communications system 200 that supports narrowband retuning in wireless communications in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described herein with reference to FIG. 1. In some cases, UE 115-a and base station 105-a may communicate on resources of a communication link 205 (e.g., PDSCH).

UE 115-a may send, to base station 105-a, an indication of a capability of UE 115-a. The capability of UE 115-a may refer to the number of symbols for retuning from a first narrowband carrier to a second narrowband carrier. Base station 105-a may schedule and send a downlink channel (e.g., PDSCH) over the narrowband carrier in narrowband subframe 210. Base station 105-a may determine a start symbol (e.g., symbol 2 or 3) for a PDSCH over a second narrowband carrier in narrowband subframe 215 consecutive to the narrowband subframe 215 based on the capability of UE 115-a. In some examples, base station 105-a may send, to UE 115-a, scheduling information indicating the coding rate and the start symbol of the PDSCH in narrowband subframe 215.

UE 115-a to perform narrowband hopping between narrowband subframe 210 and 215. UE 115-a may determine to retune in symbol 1 of subframe 215 based on using one symbol for retuning, the number of antenna ports (e.g., first and second antenna ports) configured for UE 115-a, a HARQ ID, a retransmission number, an effective coding rate for the PDSCH in subframe 210 or the PDSCH in subframe 215, the SNR, the Doppler effect, the channel type of the second PDSCH, or any combination thereof.

In some examples, UE 115-a may retune in symbol 1 of subframe 215 in the second narrowband carrier and the PDSCH start symbol may be symbol 2 or symbol 3 of subframe 215 in the second narrowband. In some examples, symbols 0 and 1 may be legacy control regions in which UE 115-a does not receive a PDSCH.

The CRS for the first and second antenna ports may be in symbols 0, 4, 7, and 11 of subframe 215 in the second narrowband. By retuning in symbol 1 of subframe 215, UE 115-a may utilize the CRS in symbol 0 of the subframe 215 for channel interpolation (or estimation) of symbol 12 and 13 of subframe 210 in the first narrowband. Utilizing the CRS in symbol 0 of subframe 215 may increase the SNR and lower the doppler effect.

Figure 3:
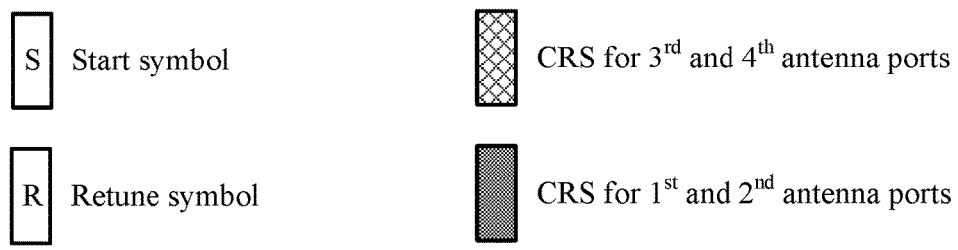
FIGS. 3 through 5 illustrate example retuning configurations that support narrowband retuning in wireless communications in accordance with aspects of the present disclosure.
Figure 3:
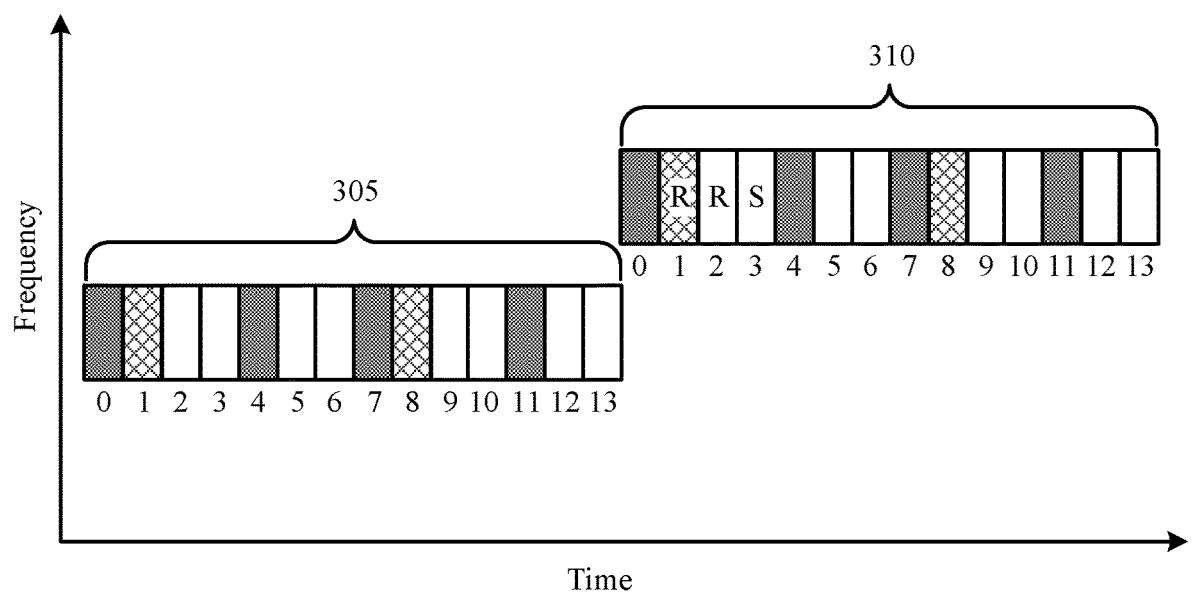

FIG. 3 illustrates an example of a retuning configuration 300 that supports narrowband retuning in wireless communications in accordance with aspects of the present disclosure. In some examples, retuning configuration 300 may implement aspects of wireless communication systems 100 or 200.

A UE may perform narrowband hopping between narrowband subframe 305 and 310. In some examples, the UE may retune in symbol 1 and symbol 2 of subframe 310 in the second narrowband and the PDSCH start symbol may be symbol 3 of subframe 310 in the second narrowband carrier.

The CRS for the first and second antenna ports may be in symbols 0, 4, 7, and 11 of subframe 305 and 310 and the CRS for the third and fourth antenna ports may be in symbols 1 and 8 of subframe 305 and 310. UE 115-a may utilize the CRS in symbol 0 of the subframe 310 for channel interpolation of symbol 12 and 13 of subframe 305 in the first narrowband carrier. Utilizing the CRS in symbol 0 of subframe 310 may increase the SNR and lower the doppler effect.

Figure 4:
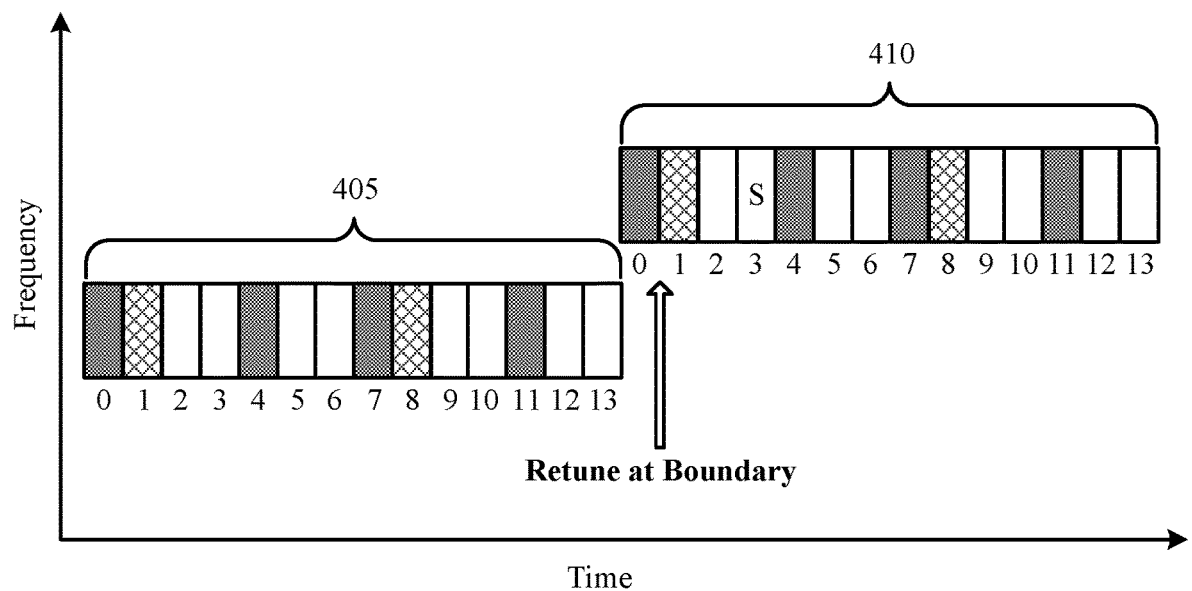

FIG. 4 illustrates an example of a retuning configuration 400 that supports narrowband retuning in wireless communications in accordance with aspects of the present disclosure. In some examples, retuning configuration 400 may implement aspects of wireless communication systems 100 or 200.

A UE may perform narrowband hopping between subframe 405 and 410 of different narrowband carriers. In some examples, the UE may not utilize a full symbol to retune and the UE may retune at the boundary between symbol 0 and symbol 1 of subframe 410 in the second narrowband carrier. The PDSCH start symbol may be symbol 3 of subframe 410 in the second narrowband carrier.

The CRS for the first and second antenna ports may be in symbols 0, 4, 7, and 11 of subframe 410 in the second narrowband and the CRS for the third and fourth antenna ports may be in symbols 1 and 8 of subframe 410 in the second narrowband. By retuning at the boundary between symbol 0 and symbol 1, the UE may not lose any CRS symbols. The UE may utilize the CRS in symbol 0 or 1 of the subframe 410 for channel interpolation (or estimation) of symbol 12 and 13 of subframe 405 in the first narrowband.

Figure 5:
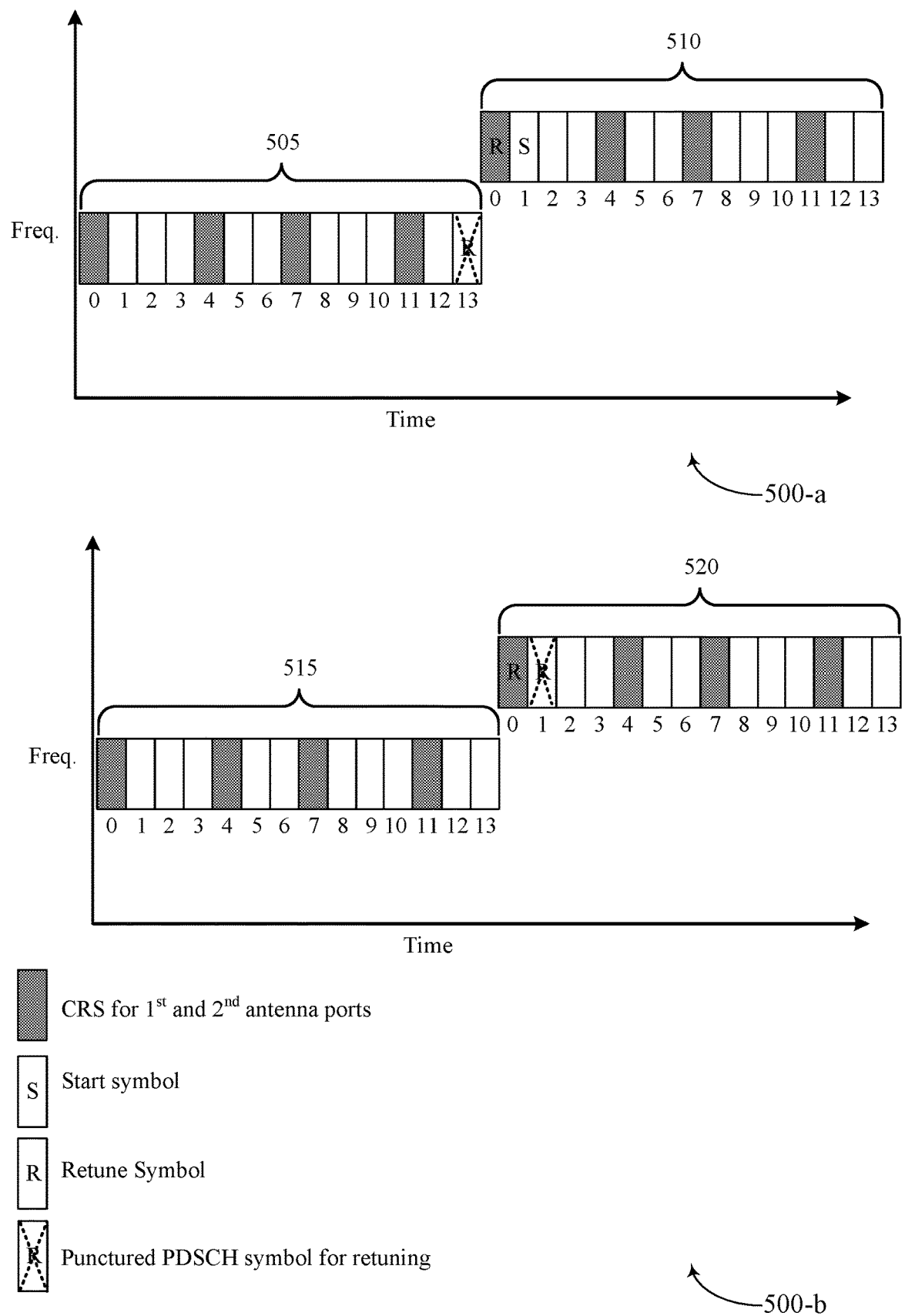

FIG. 5 illustrates example retuning configurations 500 that support narrowband retuning in wireless communications in accordance with aspects of the present disclosure. In some examples, retuning configurations 500 may implement aspects of wireless communication systems 100 or 200.

In retuning configuration 500-a, a UE may perform narrowband hopping between subframe 505 and 510 of different narrowband frequencies. In some examples, the UE may determine to puncture a symbol containing a PDSCH to use the symbol for retuning. The UE may determine to puncture symbols containing a PDSCH based on one or more parameters. The parameters may include the two symbols for retuning, the start symbol of the PDSCH (e.g., symbol 1 of subframe 510), the number of antenna ports (e.g., 1, 2, or 4 antenna ports), the HARQ ID (e.g., to ensure that the same HARQ ID is not affected by puncturing continuously), the retransmission number (e.g., a new transmission may be prioritized over retransmission), effective coding rate with retune symbol nulling, SNR (e.g., channel estimation metrics used to determine) and Doppler, or the channel type (e.g., retune symbols may be a function).

In some cases, as illustrated in retuning configuration 500-a, the PDSCH start symbol may be in symbol 1 of subframe 510 of the second narrowband. The UE may retune in symbol 13 of subframe 505 and symbol 0 of subframe 510. To retune in symbol 13 of subframe 505, the UE may puncture the PDSCH in symbol 13.

In other cases, as illustrated in retuning configuration 500-b, the UE may retune in symbol 0 and symbol 1 of subframe 520. To retune in symbol 1 of subframe 520, the UE may puncture the PDSCH start symbol in symbol 1. The UE may determine to puncture the symbol in the subframe with the lower code rate of retransmitted HARQ ID. The CRS for the first and second antenna ports may be in symbols 0, 4, 7, and 11 of subframes 505, 510, 515, and 520.

Figure 6:
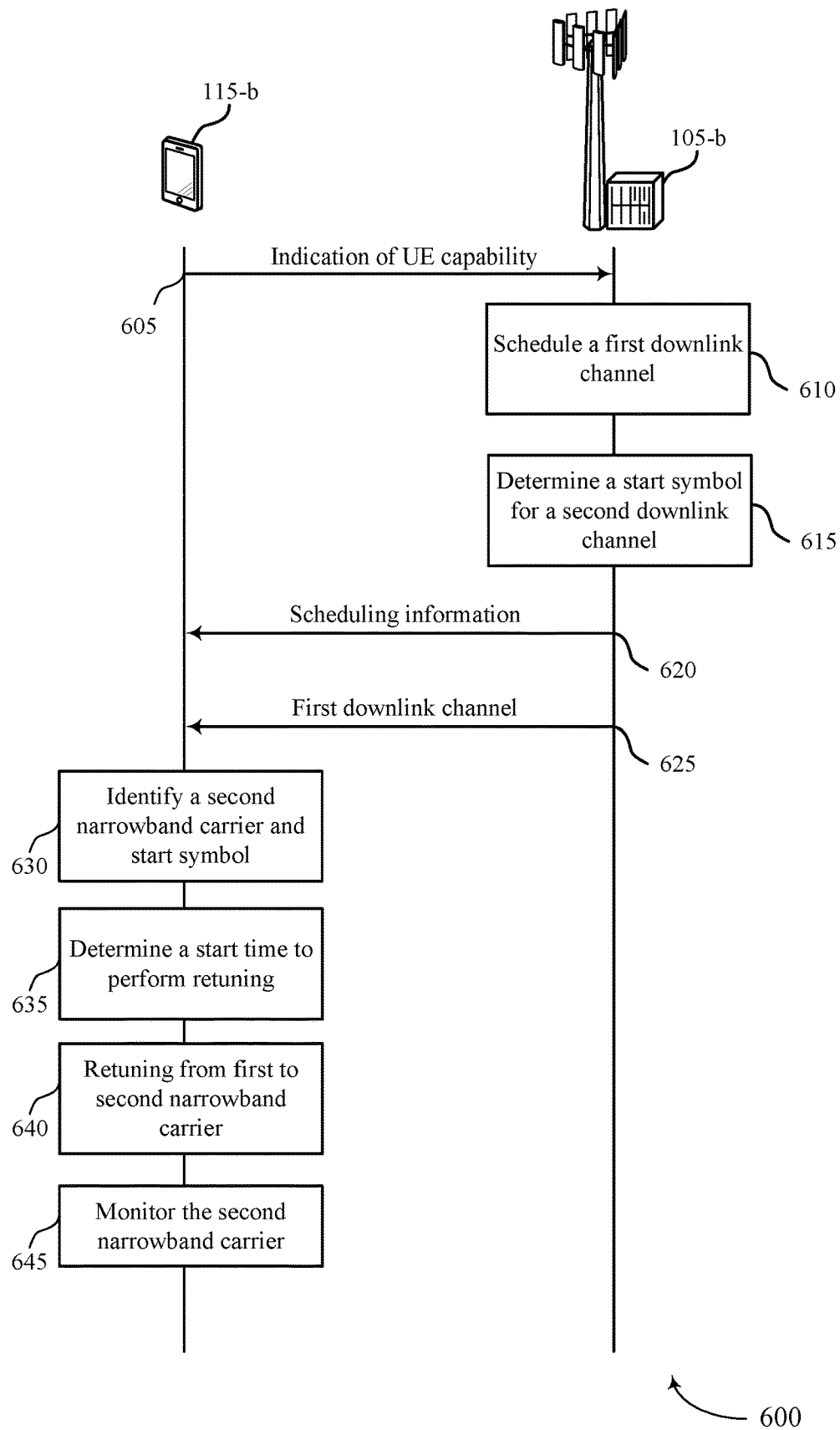
FIG. 6 illustrates an example of a process flow that supports narrowband retuning in wireless communications in accordance with aspects of the present disclosure.

FIG. 6 illustrates an example of a process flow 600 that supports narrowband retuning in wireless communications in accordance with aspects of the present disclosure. In some examples, process flow 600 may implement aspects of wireless communication system 100. Process flow 600 may include a base station 105-b and a UE 115-b, which may be examples of corresponding base stations 105 and UEs 115, respectively, as described herein with reference to FIG. 1.

At 605, base station 105-b may receive, from UE 115-b, an indication of a capability of the UE 115-b, wherein the capability of the UE 115-b may indicate a number of symbols for UE 115-b retuning.

At 610, base station 105-b may schedule, for the UE 115-b, a first downlink channel over a first carrier (e.g., a narrowband carrier) in a first subframe. Base station 105-b may determine a coding rate for a second downlink channel based on the capability of the UE 115-b, wherein the scheduling information indicates the coding rate. The first downlink channel and the second downlink channel may be downlink shared channels, downlink control channels, or any combination thereof.

At 615, base station 105-b may determine a start symbol for a second downlink channel over a second carrier (e.g., a narrowband carrier) in a second subframe adjacent the first subframe in time based on the capability of the UE 115-b.

At 620, base station 105-*b* may transmit, to the UE 115-*b*, scheduling information indicating the start symbol of the second downlink channel in the second subframe.

At 625, UE 115-*b* may receive, over the first carrier, the first downlink channel in a first subframe. At 630, UE 115-*b* may identify a second carrier and a start symbol for a second downlink channel in a second subframe adjacent the first subframe in time.

At 635, UE 115-*b* may determine a start time to perform retuning from the first carrier to the second carrier based on a capability of the UE 115-*b* and the start symbol for the second downlink channel. In some examples, UE 115-*b* may determine the start time to perform retuning based on a number of symbols for UE 115-*b* retuning, a number of antenna ports configured for the UE 115-*b*, a HARQ ID, a retransmission number, an effective coding rate for the first downlink channel or the second downlink channel, a SNR, a Doppler effect, a channel type of the first downlink channel or the second downlink channel, or any combination thereof. UE 115-*b* may determine the number of symbols based on the capability of the UE 115-*b*.

In some examples, UE 115-*b* determine to puncture at least one symbol of the first subframe or the second subframe to perform retuning based on the capability of the UE 115-*b* and the start symbol of the second downlink channel. UE 115-*b* may determine the at least one symbol to puncture based on a code rate or a retransmission identifier associated with the second downlink channel.

At 640, UE 115-*b* may retune from the first carrier to the second carrier at the start time. In some cases, UE 115-*b* may retune from the first carrier to the second carrier prior to the start symbol for the second downlink channel. In other cases, UE 115-*b* may receiving a reference signal in an initial symbol of the second subframe, perform a channel interpolation for one or more symbols before the initial symbol using the received reference signal, and retune from the first carrier to the second carrier after reception of the reference signal. UE 115-*b* may perform the retuning during one or more symbols and the one or more symbols are located in the first subframe or second subframe. Additionally or alternatively, UE 115-*b* may perform the retuning during one or more symbols and the one or more symbols span at least a portion of both the first subframe and the second subframe. In some examples, UE 115-*b* may retune from the first carrier to the second carrier at a boundary between two symbols in the second subframe.

At 645, UE 115-*b* may monitor the second carrier for the second downlink channel after retuning. In some examples, UE 115-*b* may receive, from a base station 105-*b*, the second downlink channel in the second subframe over the second carrier after retuning based on the monitoring.

Figure 7:
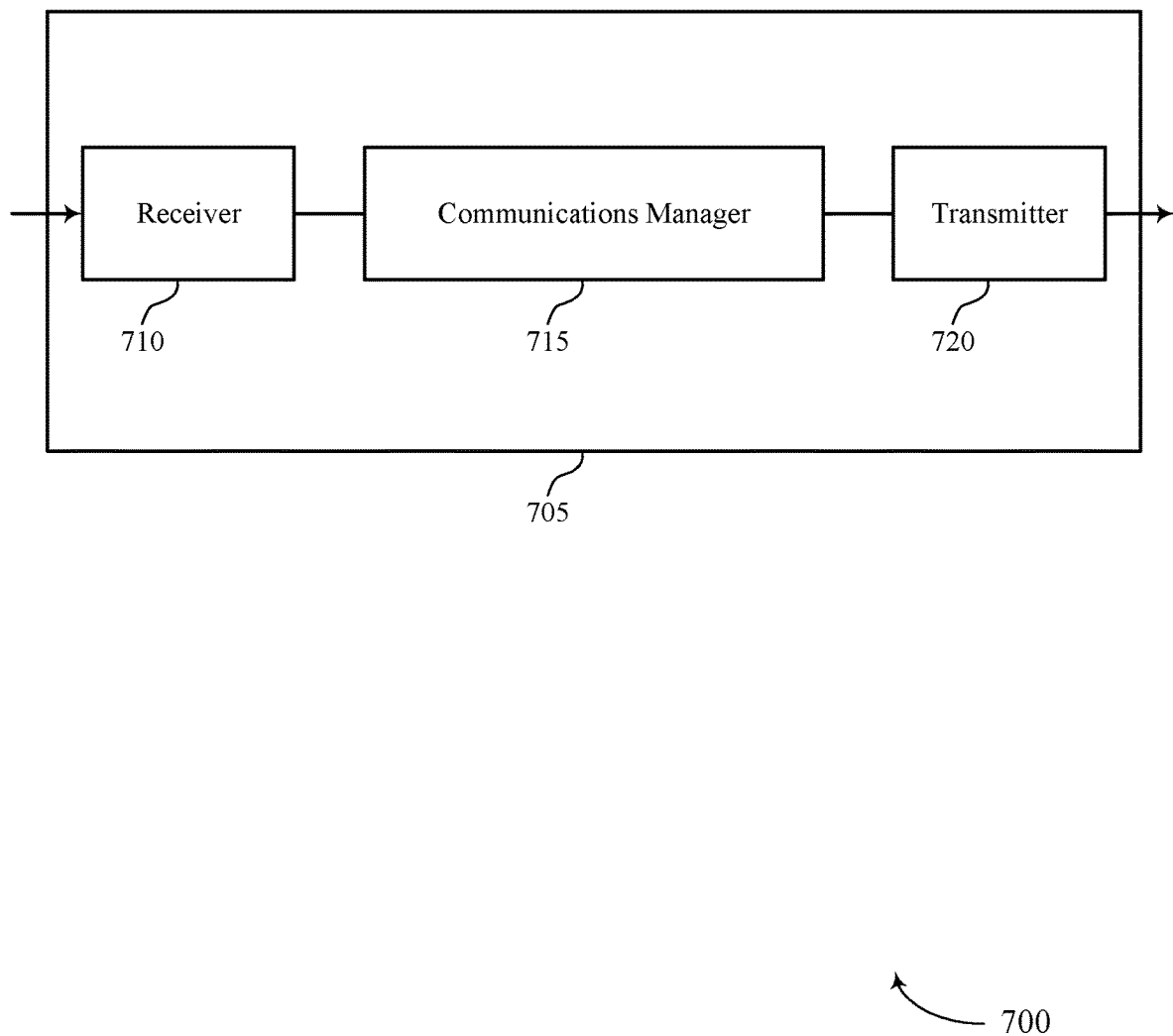
FIGS. 7 and 8 show diagrams of devices that support narrowband retuning in wireless communications in accordance with aspects of the present disclosure.

FIG. 7 shows a diagram 700 of a device 705 that supports narrowband retuning in wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to narrowband retuning in wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, over a first carrier, a first downlink channel in a first subframe, identify a second carrier and a start symbol for a second downlink channel in a second subframe adjacent the first subframe in time, determine a start time to perform retuning from the first carrier to the second carrier based on a capability of the UE and the start symbol for the second downlink channel, retune from the first carrier to the second carrier at the start time, and monitor the second carrier for the second downlink channel after retuning. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow the device 705 to determine a start time to perform retuning and retuning from one narrowband carrier to another. Determining an appropriate stat time for retuning may increase reliability and reduce latency during communications. Such techniques may also allow for more efficient communications as reference signals may be utilized rather than dropped or lost.

Based on techniques for implementing retuning from one narrowband carrier to another as described herein, a processor of a UE 115 (e.g., controlling the receiver 710, the transmitter 720, or the transceiver 1020 as described with reference to FIG. 10) may increase reliability and decrease signaling overhead in the communications because the UE 115 may avoid going through unnecessary configuration processes during retuning.

Figure 8:
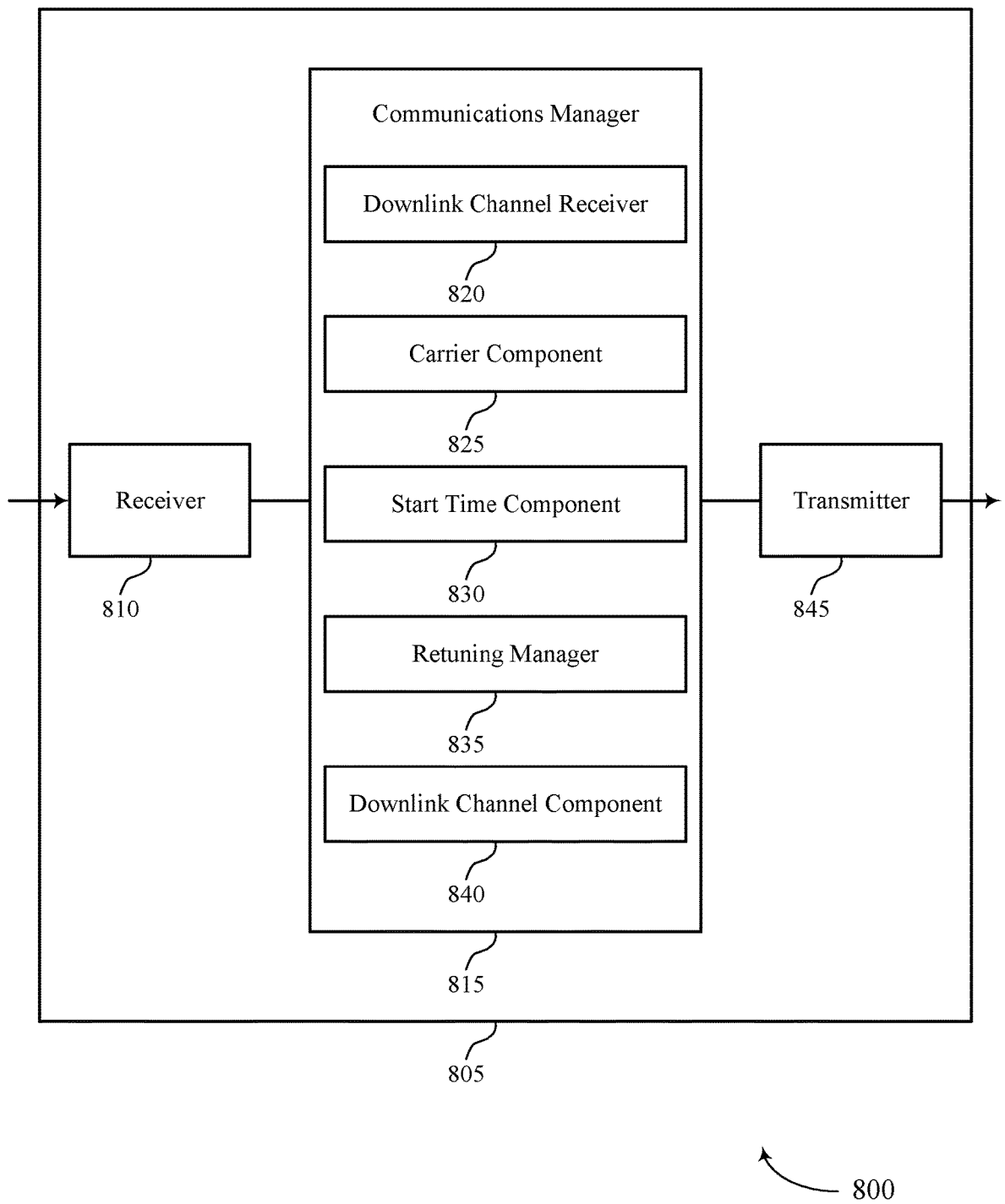

FIG. 8 shows a diagram 800 of a device 805 that supports narrowband retuning in wireless communications in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to narrowband retuning in wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a downlink channel receiver 820, a carrier component 825, a start time component 830, a retuning manager 835, and a downlink channel component 840. The communications manager 815 may be an example of aspects of the communications manager 1010 described herein.

The downlink channel receiver 820 may receive, over a first carrier, a first downlink channel in a first subframe.

The carrier component 825 may identify a second carrier and a start symbol for a second downlink channel in a second subframe adjacent the first subframe in time.

The start time component 830 may determine a start time to perform retuning from the first carrier to the second carrier based on a capability of the UE and the start symbol for the second downlink channel.

The retuning manager 835 may retune from the first carrier to the second carrier at the start time.

The downlink channel component 840 may monitor the second carrier for the second downlink channel after retuning.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
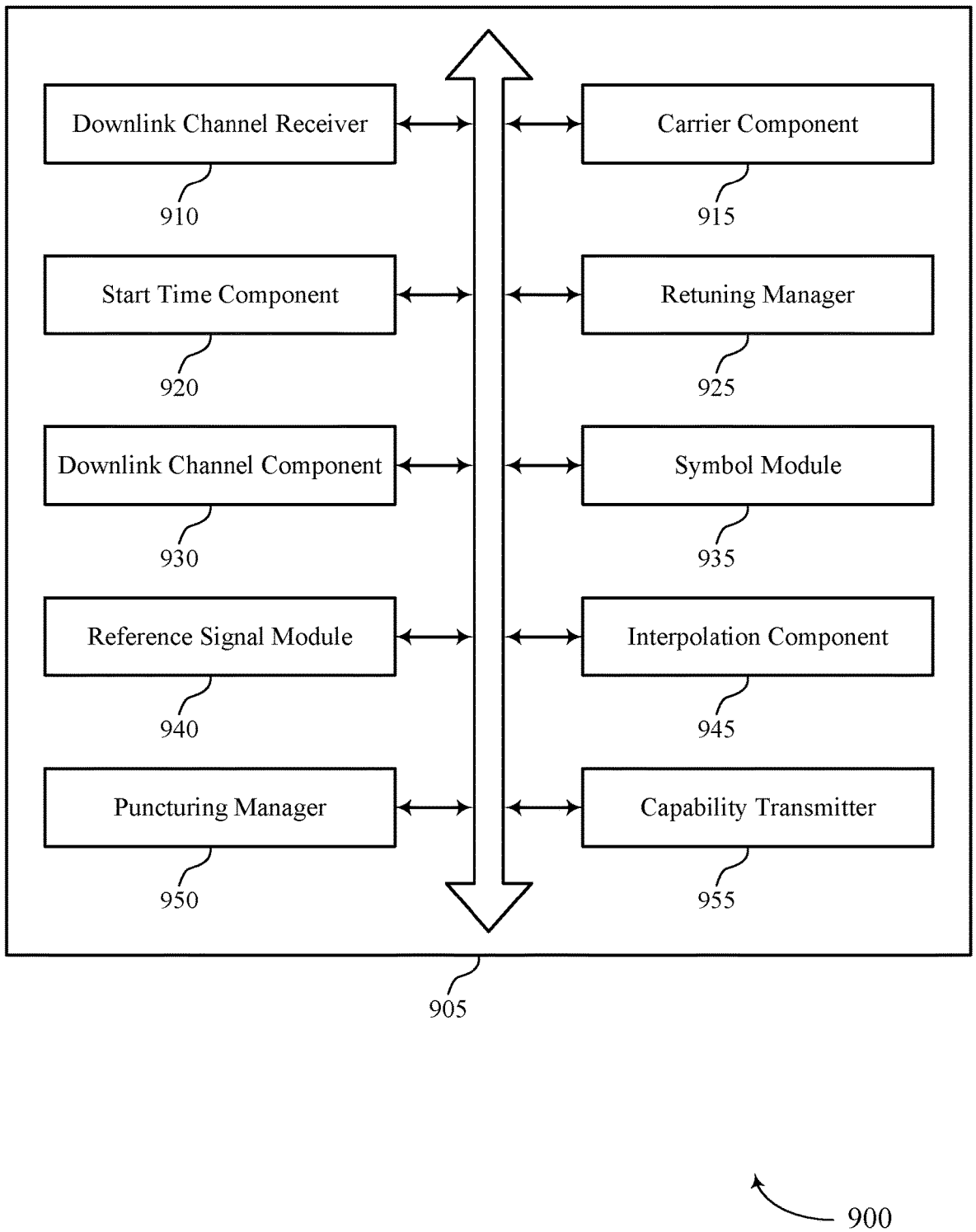
FIG. 9 shows a diagram of a communications manager that supports narrowband retuning in wireless communications in accordance with aspects of the present disclosure.

FIG. 9 shows a diagram 900 of a communications manager 905 that supports narrowband retuning in wireless communications in accordance with aspects of the present disclosure. The communications manager 905 may be an example of aspects of a communications manager 715, a communications manager 815, or a communications manager 1010 described herein. The communications manager 905 may include a downlink channel receiver 910, a carrier component 915, a start time component 920, a retuning manager 925, a downlink channel component 930, a symbol module 935, a reference signal module 940, an interpolation component 945, a puncturing manager 950, and a capability transmitter 955. Each of these modules may communicate, directly or indirectly, with one another (e.g., via one or more buses).

The downlink channel receiver 910 may receive, over a first carrier, a first downlink channel in a first subframe. In some examples, the downlink channel receiver 910 may receive, from a base station, the second downlink channel in the second subframe over the second carrier after retuning based on the monitoring.

The carrier component 915 may identify a second carrier and a start symbol for a second downlink channel in a second subframe adjacent the first subframe in time. In some cases, one or both of the first carrier and the second carrier is a narrowband carrier.

The start time component 920 may determine a start time to perform retuning from the first carrier to the second carrier based on a capability of the UE and the start symbol for the second downlink channel. In some examples, the start time component 920 may determine the start time to perform retuning based on a number of symbols for UE retuning, a number of antenna ports configured for the UE, or any combination thereof. In some cases, the start time component 920 may determine the start time to perform retuning based on a HARQ ID, a retransmission number, an effective coding rate for the first downlink channel or the second downlink channel, a signal to noise ratio, a Doppler effect, a channel type of the first downlink channel or the second downlink channel, or any combination thereof.

The retuning manager 925 may retune from the first carrier to the second carrier at the start time. In some examples, the retuning manager 925 may retune from the first carrier to the second carrier prior to the start symbol for the second downlink channel. In some cases, the retuning manager 925 may retune from the first carrier to the second carrier after reception of the reference signal. In some aspects, the retuning manager 925 may retune is performed during one or more symbols and the one or more symbols are located in the first subframe. In some instances, the retuning manager 925 may retune is performed during one or more symbols and the one or more symbols are located in the second subframe.

In some examples, the retuning manager 925 may retune is performed during one or more symbols and the one or more symbols span at least a portion of both the first subframe and the second subframe. In some cases, the retuning manager 925 may retune from the first carrier to the second carrier at a boundary between two symbols in the second subframe.

The downlink channel component 930 may monitor the second carrier for the second downlink channel after retuning. In some cases, the first downlink channel and the second downlink channel are downlink shared channels, downlink control channels, or any combination thereof.

The symbol module 935 may determine the number of symbols for UE retuning based on the capability of the UE.

The reference signal module 940 may receive a reference signal in an initial symbol of the second subframe.

The interpolation component 945 may perform a channel interpolation for one or more symbols before the initial symbol using the received reference signal.

The puncturing manager 950 may determine to puncture at least one symbol of the first subframe or the second subframe to perform retuning based on the capability of the UE and the start symbol of the second downlink channel. In some examples, the puncturing manager 950 may determine the at least one symbol based on a code rate or a retransmission identifier associated with the second downlink channel.

The capability transmitter 955 may transmit, to a base station, an indication of the capability of the UE.

Figure 10:
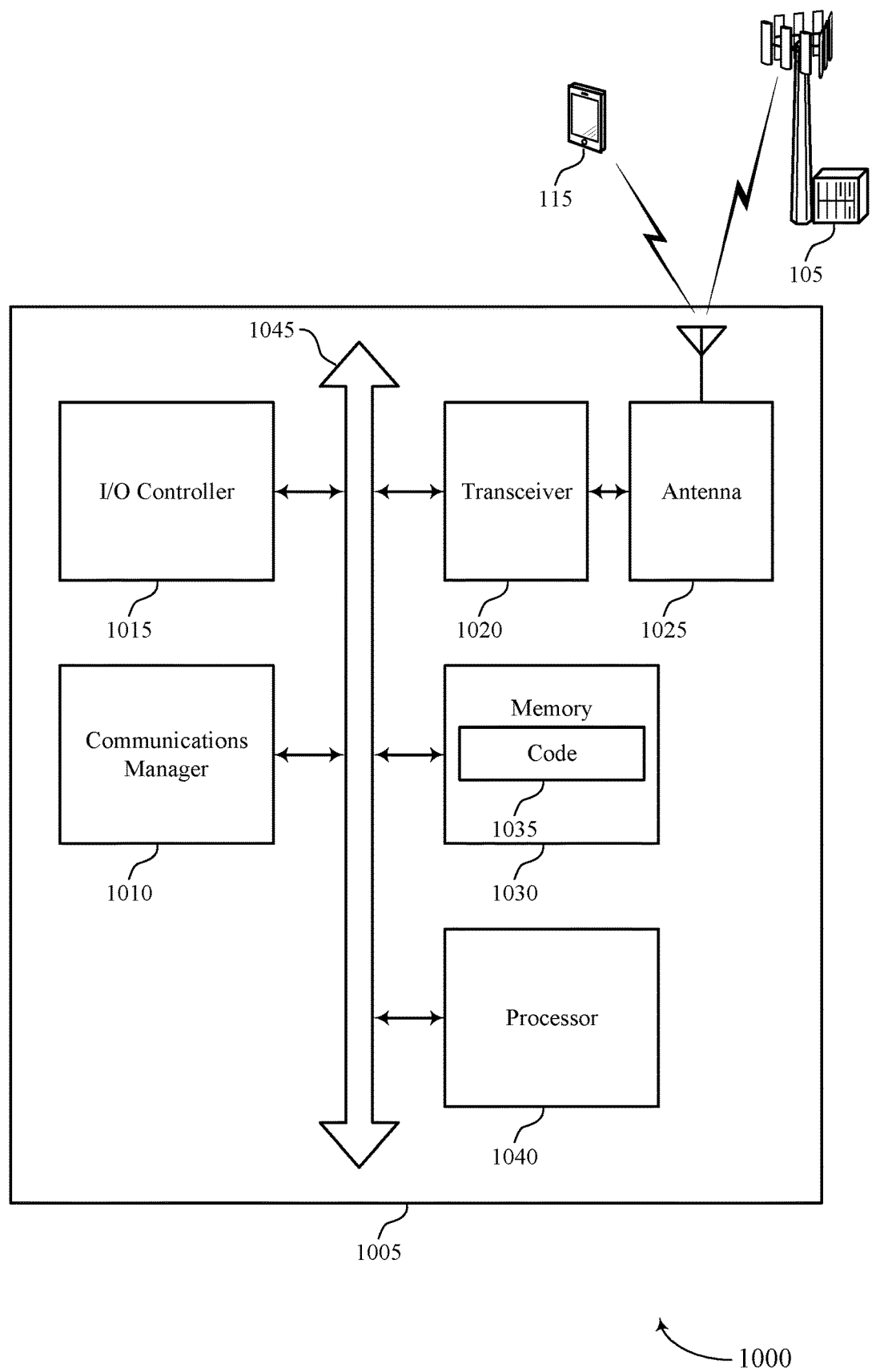
FIG. 10 shows a diagram of a system including a device that supports narrowband retuning in wireless communications in accordance with aspects of the present disclosure.

FIG. 10 shows a diagram of a system 1000 including a device 1005 that supports narrowband retuning in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, over a first carrier, a first downlink channel in a first subframe, identify a second carrier and a start symbol for a second downlink channel in a second subframe adjacent the first subframe in time, determine a start time to perform retuning from the first carrier to the second carrier based on a capability of the UE and the start symbol for the second downlink channel, retune from the first carrier to the second carrier at the start time, and monitor the second carrier for the second downlink channel after retuning.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025. However, in some cases, the device 1005 may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting narrowband retuning in wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
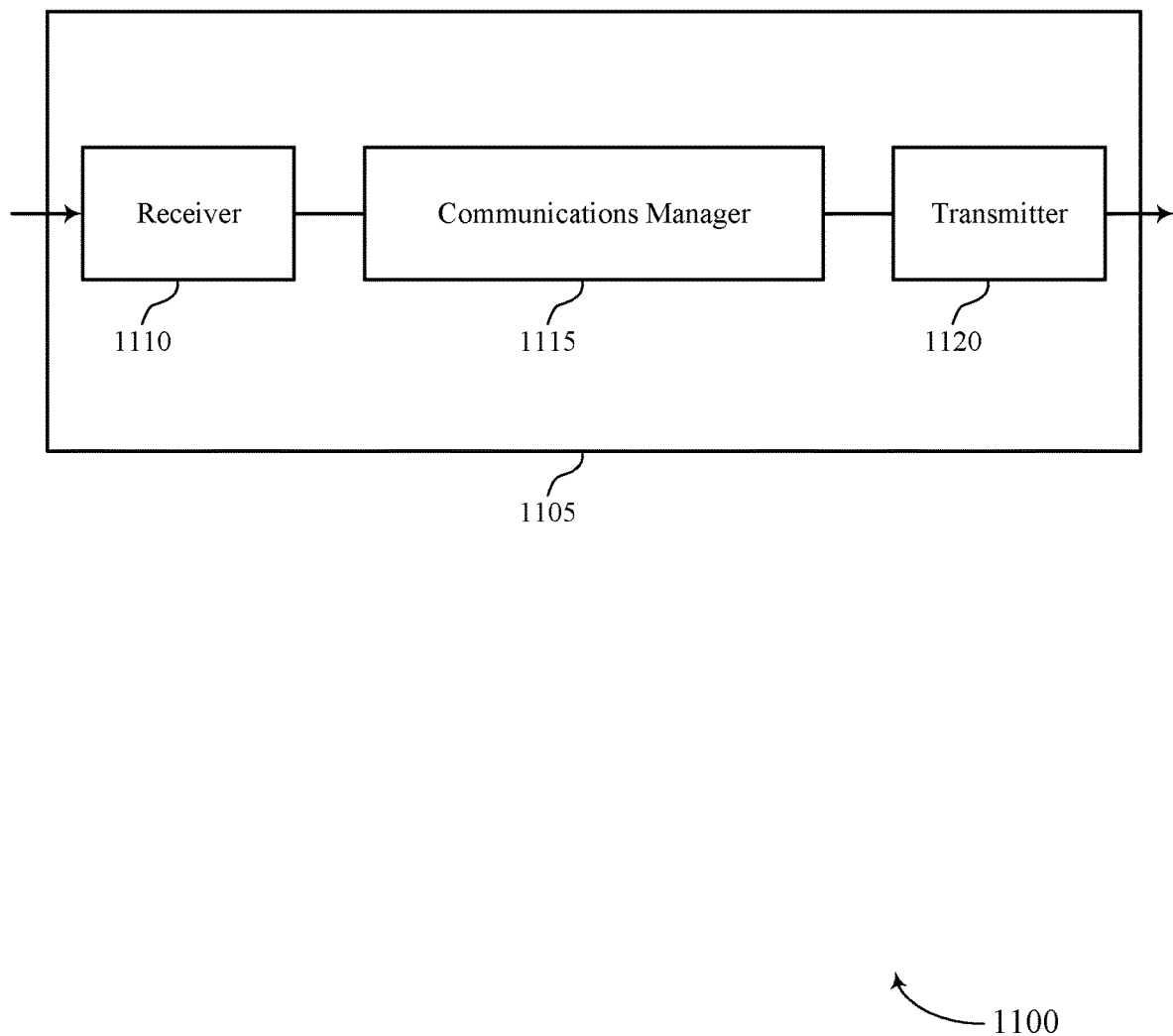
FIGS. 11 and 12 show diagrams of devices that support narrowband retuning in wireless communications in accordance with aspects of the present disclosure.

FIG. 11 shows a diagram 1100 of a device 1105 that supports narrowband retuning in wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to narrowband retuning in wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a UE, an indication of a capability of the UE, where the capability of the UE indicates a number of symbols for UE retuning, schedule, for the UE, a first downlink channel over a first carrier in a first subframe, determine a start symbol for a second downlink channel over a second carrier in a second subframe adjacent the first subframe in time based on the capability of the UE, and transmit, to the UE, scheduling information indicating the start symbol of the second downlink channel in the second subframe. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
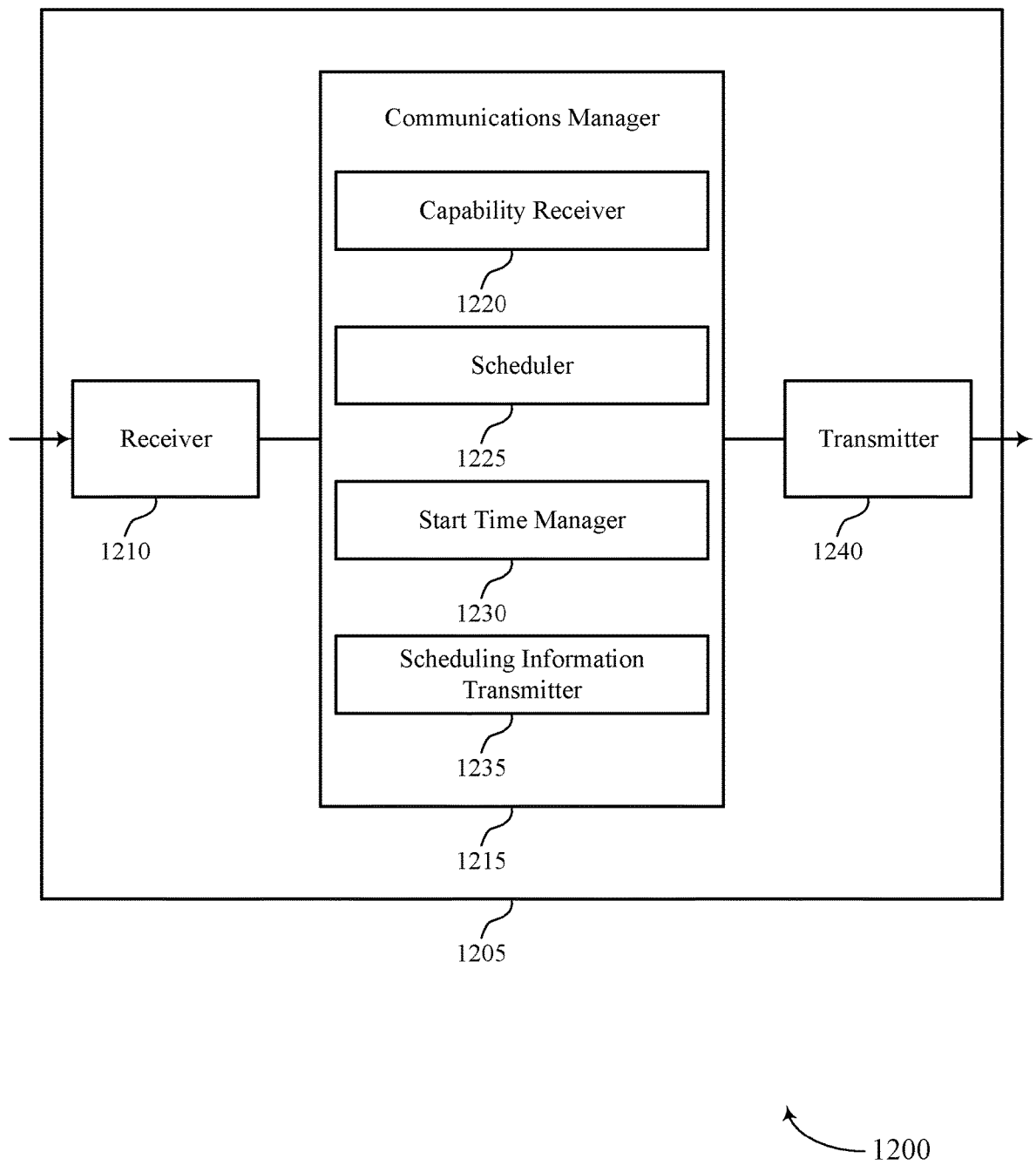

FIG. 12 shows a diagram 1200 of a device 1205 that supports narrowband retuning in wireless communications in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to narrowband retuning in wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a capability receiver 1220, a scheduler 1225, a start time manager 1230, and a scheduling information transmitter 1235. The communications manager 1215 may be an example of aspects of the communications manager 1410 described herein.

The capability receiver 1220 may receive, from a UE, an indication of a capability of the UE, where the capability of the UE indicates a number of symbols for UE retuning.

The scheduler 1225 may schedule, for the UE, a first downlink channel over a first carrier in a first subframe.

The start time manager 1230 may determine a start symbol for a second downlink channel over a second carrier in a second subframe adjacent the first subframe in time based on the capability of the UE.

The scheduling information transmitter 1235 may transmit, to the UE, scheduling information indicating the start symbol of the second downlink channel in the second subframe.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
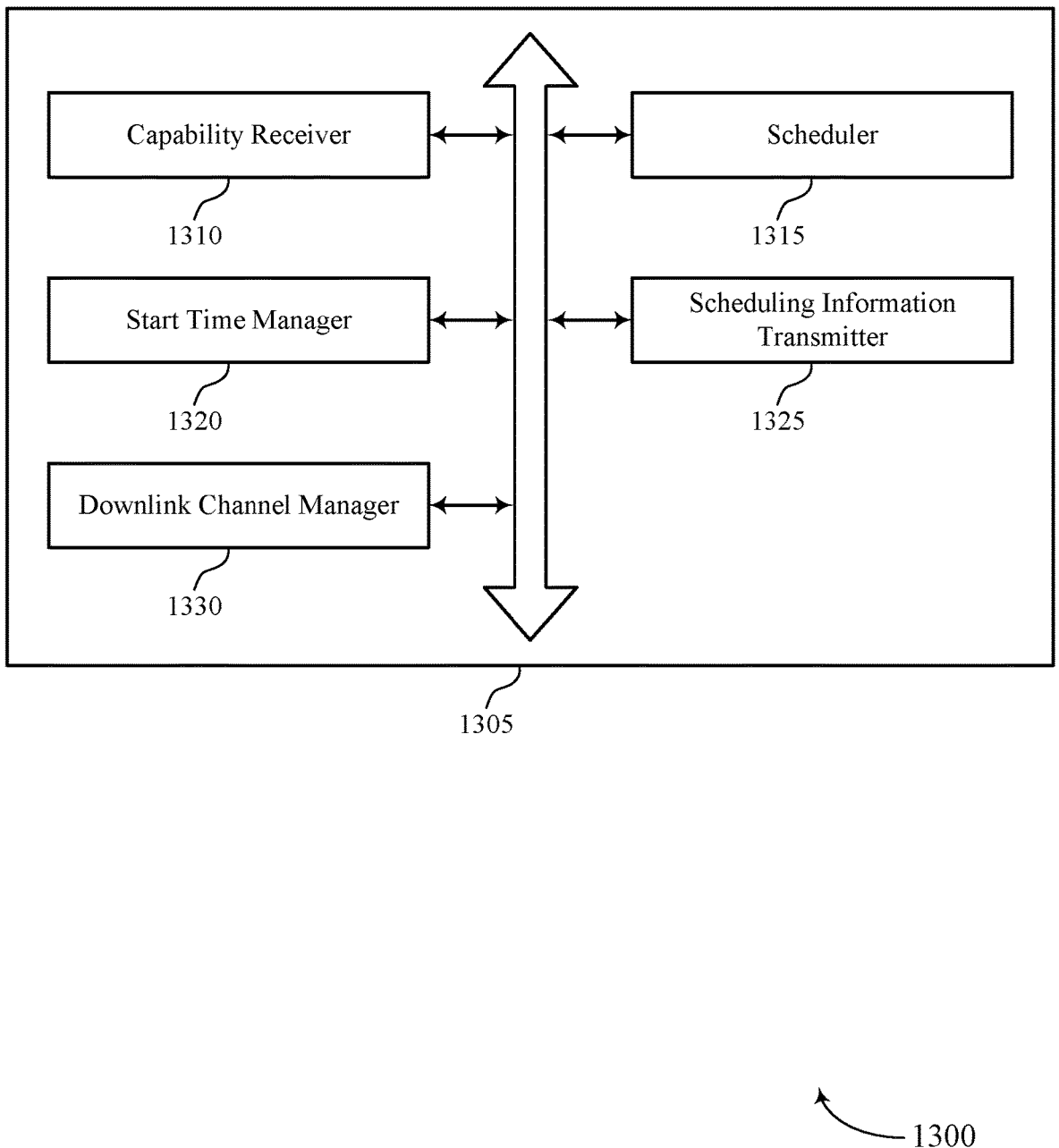
FIG. 13 shows a diagram of a communications manager that supports narrowband retuning in wireless communications in accordance with aspects of the present disclosure.

FIG. 13 shows a diagram 1300 of a communications manager 1305 that supports narrowband retuning in wireless communications in accordance with aspects of the present disclosure. The communications manager 1305 may be an example of aspects of a communications manager 1115, a communications manager 1215, or a communications manager 1410 described herein. The communications manager 1305 may include a capability receiver 1310, a scheduler 1315, a start time manager 1320, a scheduling information transmitter 1325, and a downlink channel manager 1330. Each of these modules may communicate, directly or indirectly, with one another (e.g., via one or more buses).

The capability receiver 1310 may receive, from a UE, an indication of a capability of the UE, where the capability of the UE indicates a number of symbols for UE retuning. In some examples, the capability receiver 1310 may determine a coding rate for the second downlink channel based on the capability of the UE, where the scheduling information indicates the coding rate.

The scheduler 1315 may schedule, for the UE, a first downlink channel over a first carrier in a first subframe.

The start time manager 1320 may determine a start symbol for a second downlink channel over a second carrier in a second subframe adjacent the first subframe in time based on the capability of the UE.

The scheduling information transmitter 1325 may transmit, to the UE, scheduling information indicating the start symbol of the second downlink channel in the second subframe.

The downlink channel manager 1330 may transmit, over the first carrier, the first downlink channel in the first subframe. In some examples, the downlink channel manager 1330 may transmit, over the second carrier, the second downlink channel in the second subframe. In some cases, one or both of the first carrier and the second carrier is a narrowband carrier.

Figure 14:
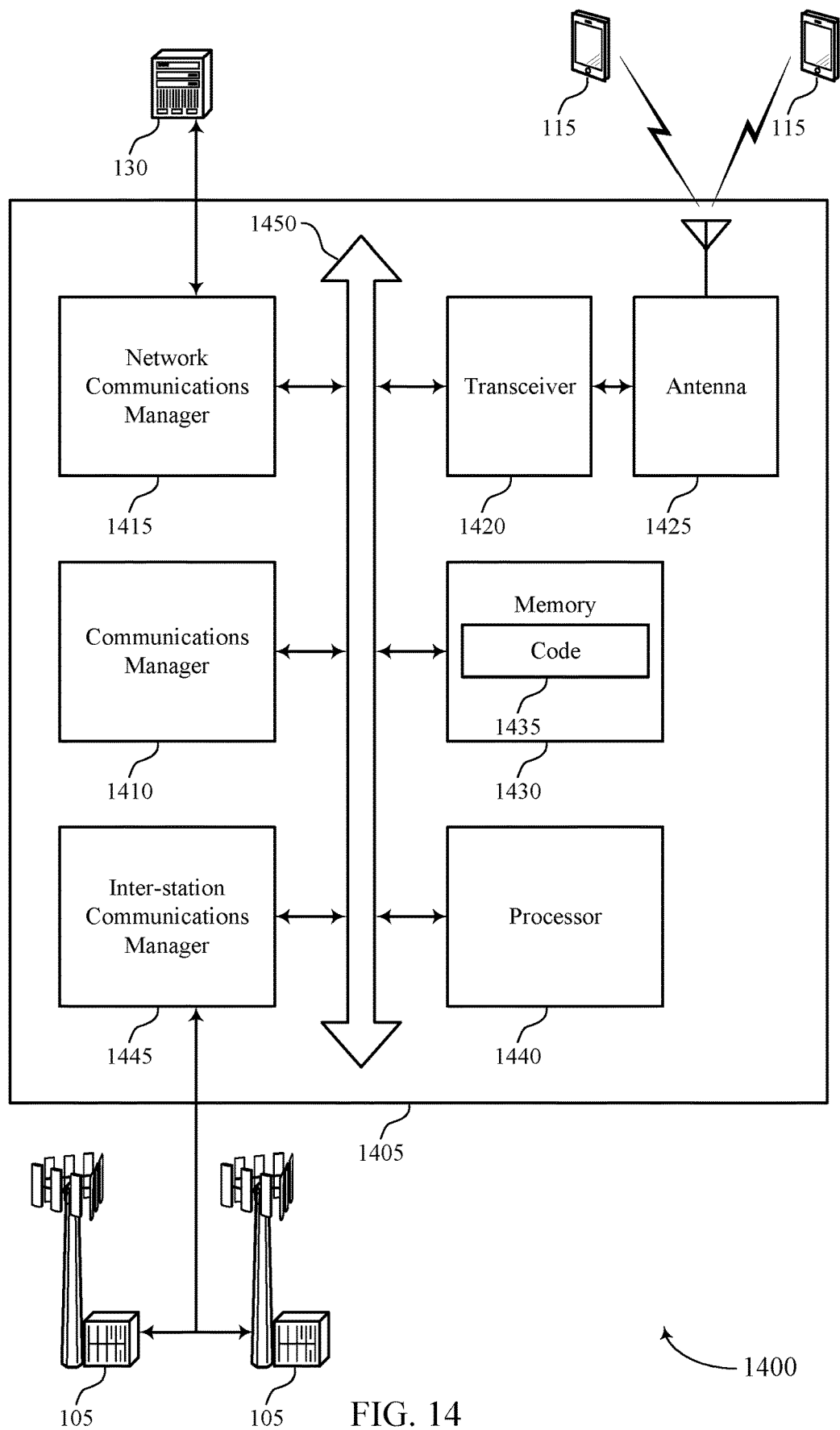
FIG. 14 shows a diagram of a system including a device that supports narrowband retuning in wireless communications in accordance with aspects of the present disclosure.

FIG. 14 shows a diagram of a system 1400 including a device 1405 that supports narrowband retuning in wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a UE, an indication of a capability of the UE, where the capability of the UE indicates a number of symbols for UE retuning, schedule, for the UE, a first downlink channel over a first carrier in a first subframe, determine a start symbol for a second downlink channel over a second carrier in a second subframe adjacent the first subframe in time based on the capability of the UE, and transmit, to the UE, scheduling information indicating the start symbol of the second downlink channel in the second subframe.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting narrowband retuning in wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
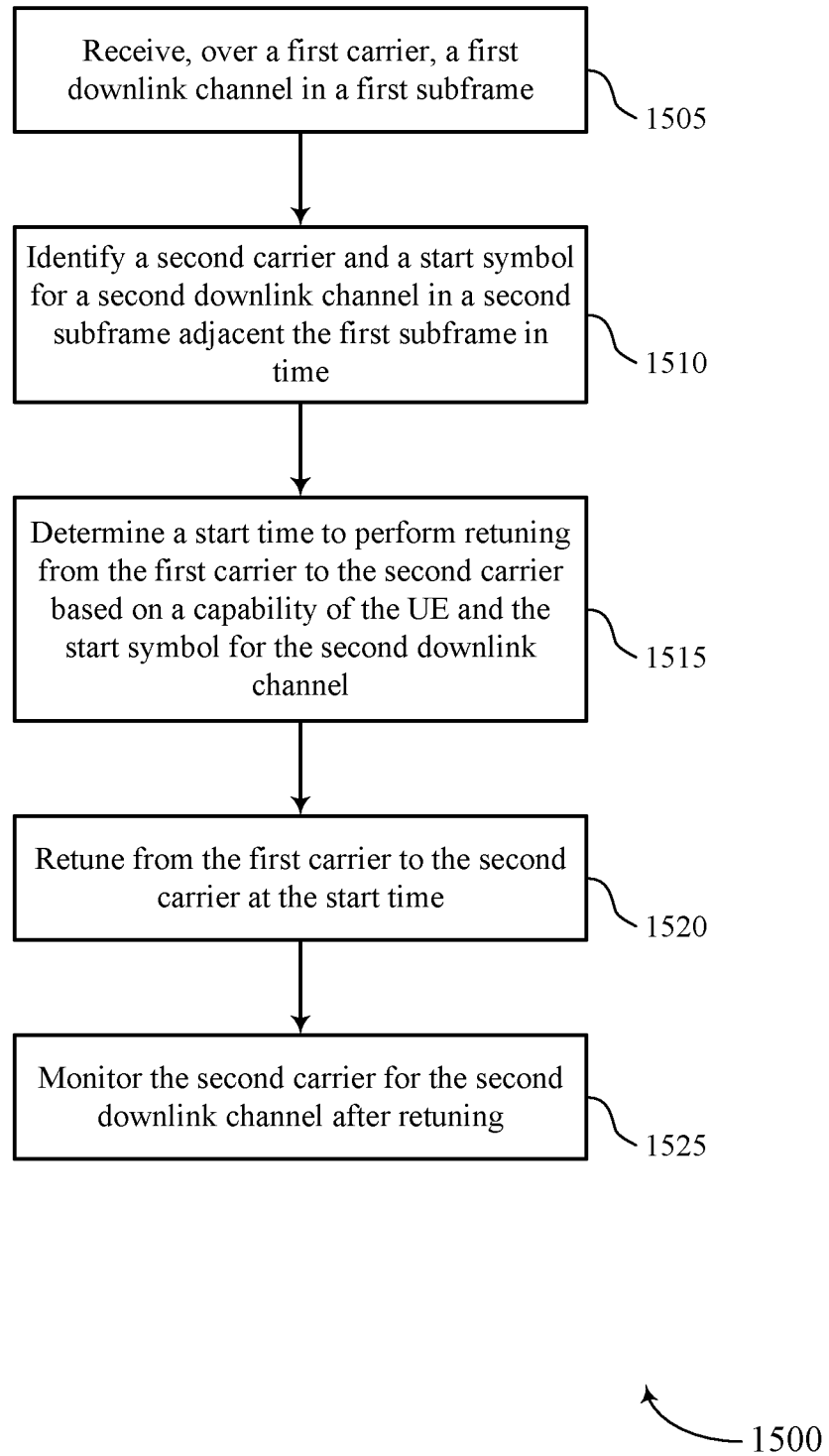
FIGS. 15 through 19 show flowcharts illustrating methods that support narrowband retuning in wireless communications in accordance with aspects of the present disclosure.

FIG. 15 shows a flowchart illustrating a method 1500 that supports narrowband retuning in wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, over a first carrier, a first downlink channel in a first subframe. The operations of 1505 may be performed according to the methods described herein. In some examples, aspects of the operations of 1505 may be performed by a downlink channel receiver as described with reference to FIGS. 7 through 10.

At 1510, the UE may identify a second carrier and a start symbol for a second downlink channel in a second subframe adjacent the first subframe in time. The operations of 1510 may be performed according to the methods described herein. In some examples, aspects of the operations of 1510 may be performed by a carrier component as described with reference to FIGS. 7 through 10.

At 1515, the UE may determine a start time to perform retuning from the first carrier to the second carrier based on a capability of the UE and the start symbol for the second downlink channel. The operations of 1515 may be performed according to the methods described herein. In some examples, aspects of the operations of 1515 may be performed by a start time component as described with reference to FIGS. 7 through 10.

At 1520, the UE may retune from the first carrier to the second carrier at the start time. The operations of 1520 may be performed according to the methods described herein. In some examples, aspects of the operations of 1520 may be performed by a retuning manager as described with reference to FIGS. 7 through 10.

At 1525, the UE may monitor the second carrier for the second downlink channel after retuning. The operations of 1525 may be performed according to the methods described herein. In some examples, aspects of the operations of 1525 may be performed by a downlink channel component as described with reference to FIGS. 7 through 10.

Figure 16:
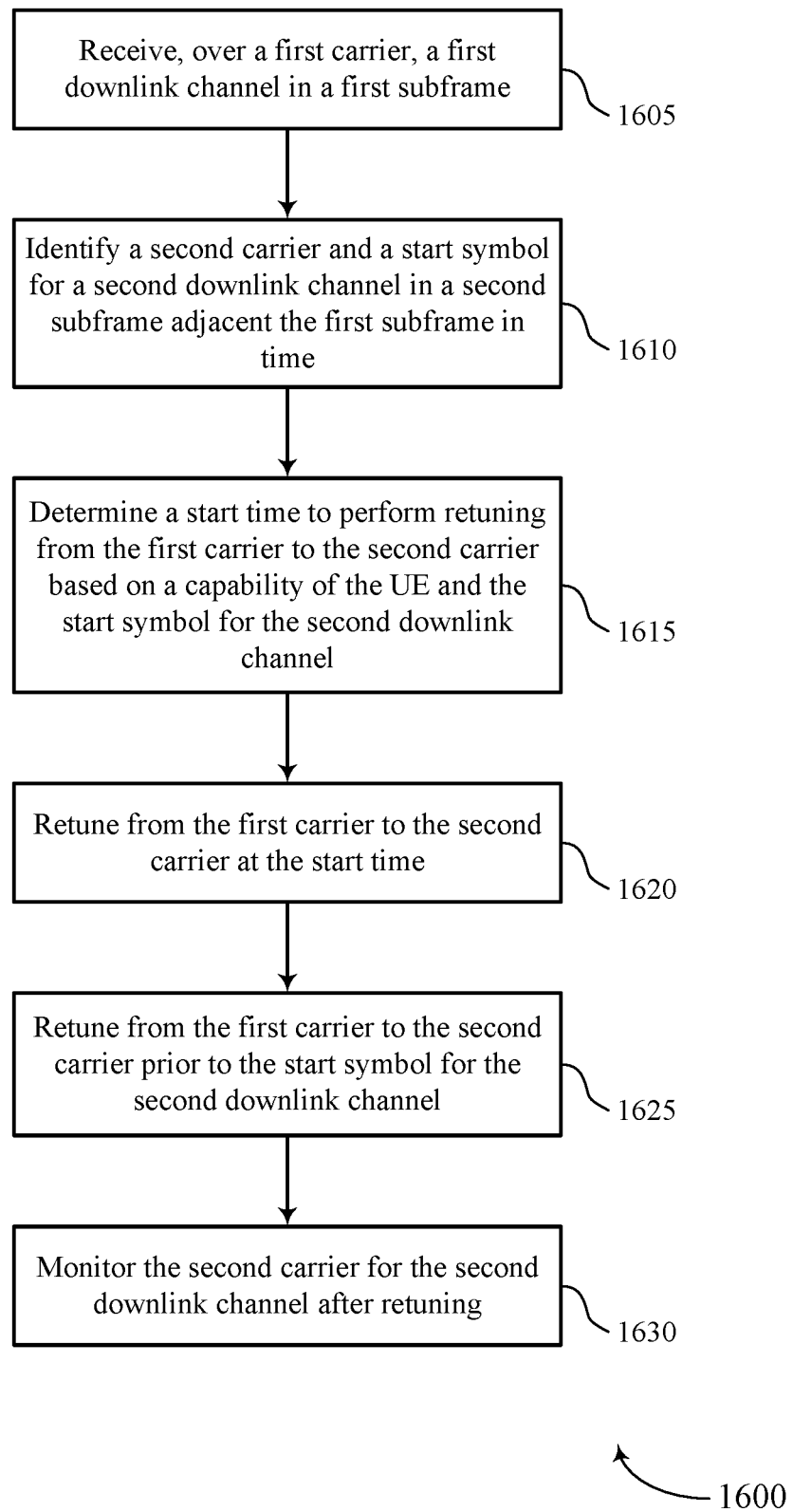

FIG. 16 shows a flowchart illustrating a method 1600 that supports narrowband retuning in wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, over a first carrier, a first downlink channel in a first subframe. The operations of 1605 may be performed according to the methods described herein. In some examples, aspects of the operations of 1605 may be performed by a downlink channel receiver as described with reference to FIGS. 7 through 10.

At 1610, the UE may identify a second carrier and a start symbol for a second downlink channel in a second subframe adjacent the first subframe in time. The operations of 1610 may be performed according to the methods described herein. In some examples, aspects of the operations of 1610 may be performed by a carrier component as described with reference to FIGS. 7 through 10.

At 1615, the UE may determine a start time to perform retuning from the first carrier to the second carrier based on a capability of the UE and the start symbol for the second downlink channel. The operations of 1615 may be performed according to the methods described herein. In some examples, aspects of the operations of 1615 may be performed by a start time component as described with reference to FIGS. 7 through 10.

At 1620, the UE may retune from the first carrier to the second carrier at the start time. The operations of 1620 may be performed according to the methods described herein. In some examples, aspects of the operations of 1620 may be performed by a retuning manager as described with reference to FIGS. 7 through 10.

At 1625, the UE may retune from the first carrier to the second carrier prior to the start symbol for the second downlink channel. The operations of 1625 may be performed according to the methods described herein. In some examples, aspects of the operations of 1625 may be performed by a retuning manager as described with reference to FIGS. 7 through 10.

At 1630, the UE may monitor the second carrier for the second downlink channel after retuning. The operations of 1630 may be performed according to the methods described herein. In some examples, aspects of the operations of 1630 may be performed by a downlink channel component as described with reference to FIGS. 7 through 10.

Figure 17:
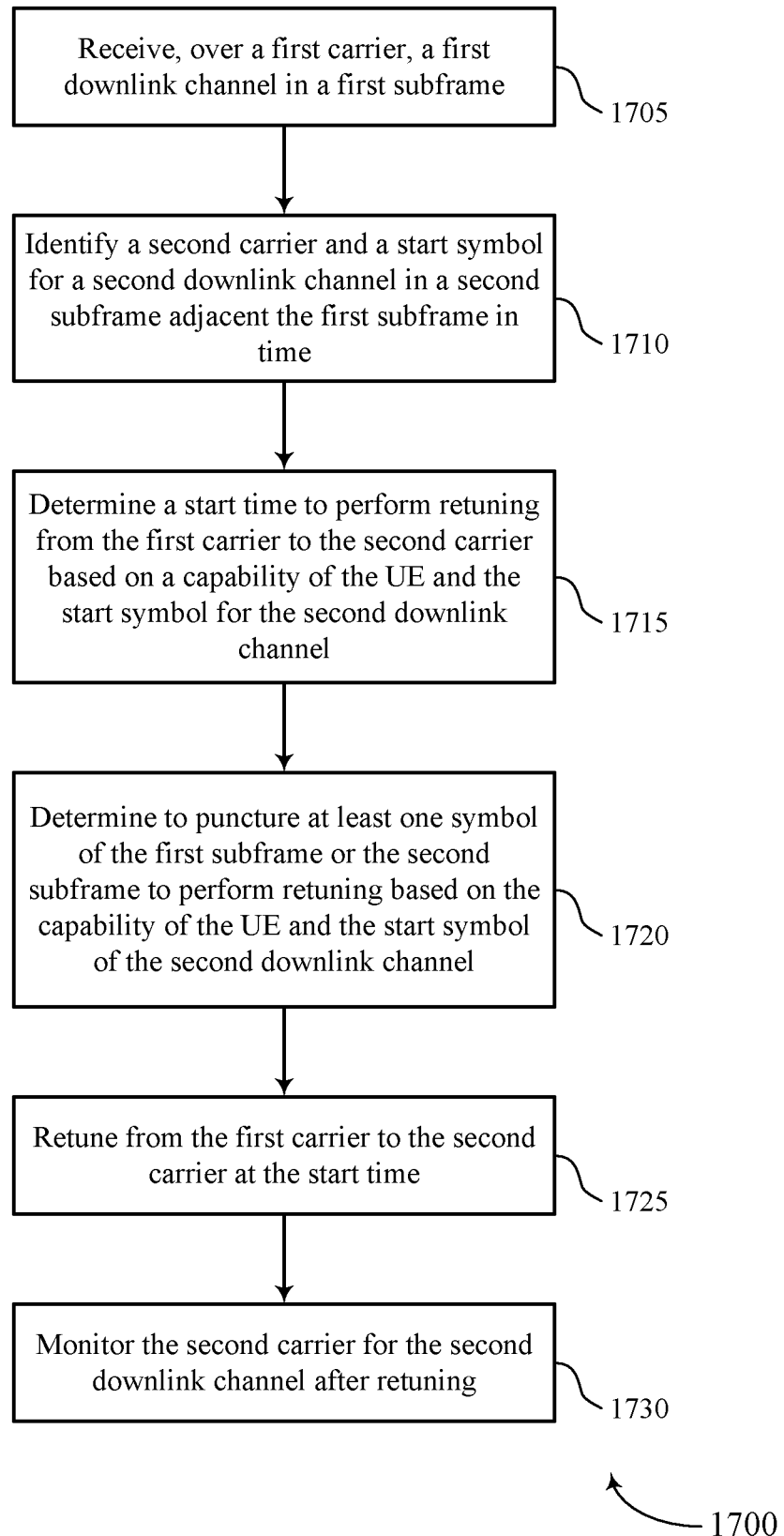

FIG. 17 shows a flowchart illustrating a method 1700 that supports narrowband retuning in wireless communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive, over a first carrier, a first downlink channel in a first subframe. The operations of 1705 may be performed according to the methods described herein. In some examples, aspects of the operations of 1705 may be performed by a downlink channel receiver as described with reference to FIGS. 7 through 10.

At 1710, the UE may identify a second carrier and a start symbol for a second downlink channel in a second subframe adjacent the first subframe in time. The operations of 1710 may be performed according to the methods described herein. In some examples, aspects of the operations of 1710 may be performed by a carrier component as described with reference to FIGS. 7 through 10.

At 1715, the UE may determine a start time to perform retuning from the first carrier to the second carrier based on a capability of the UE and the start symbol for the second downlink channel. The operations of 1715 may be performed according to the methods described herein. In some examples, aspects of the operations of 1715 may be performed by a start time component as described with reference to FIGS. 7 through 10.

At 1720, the UE may determine to puncture at least one symbol of the first subframe or the second subframe to perform retuning based on the capability of the UE and the start symbol of the second downlink channel. The operations of 1720 may be performed according to the methods described herein. In some examples, aspects of the operations of 1720 may be performed by a puncturing manager as described with reference to FIGS. 7 through 10.

At 1725, the UE may retune from the first carrier to the second carrier at the start time. The operations of 1725 may be performed according to the methods described herein. In some examples, aspects of the operations of 1725 may be performed by a retuning manager as described with reference to FIGS. 7 through 10.

At 1730, the UE may monitor the second carrier for the second downlink channel after retuning. The operations of 1730 may be performed according to the methods described herein. In some examples, aspects of the operations of 1730 may be performed by a downlink channel component as described with reference to FIGS. 7 through 10.

Figure 18:
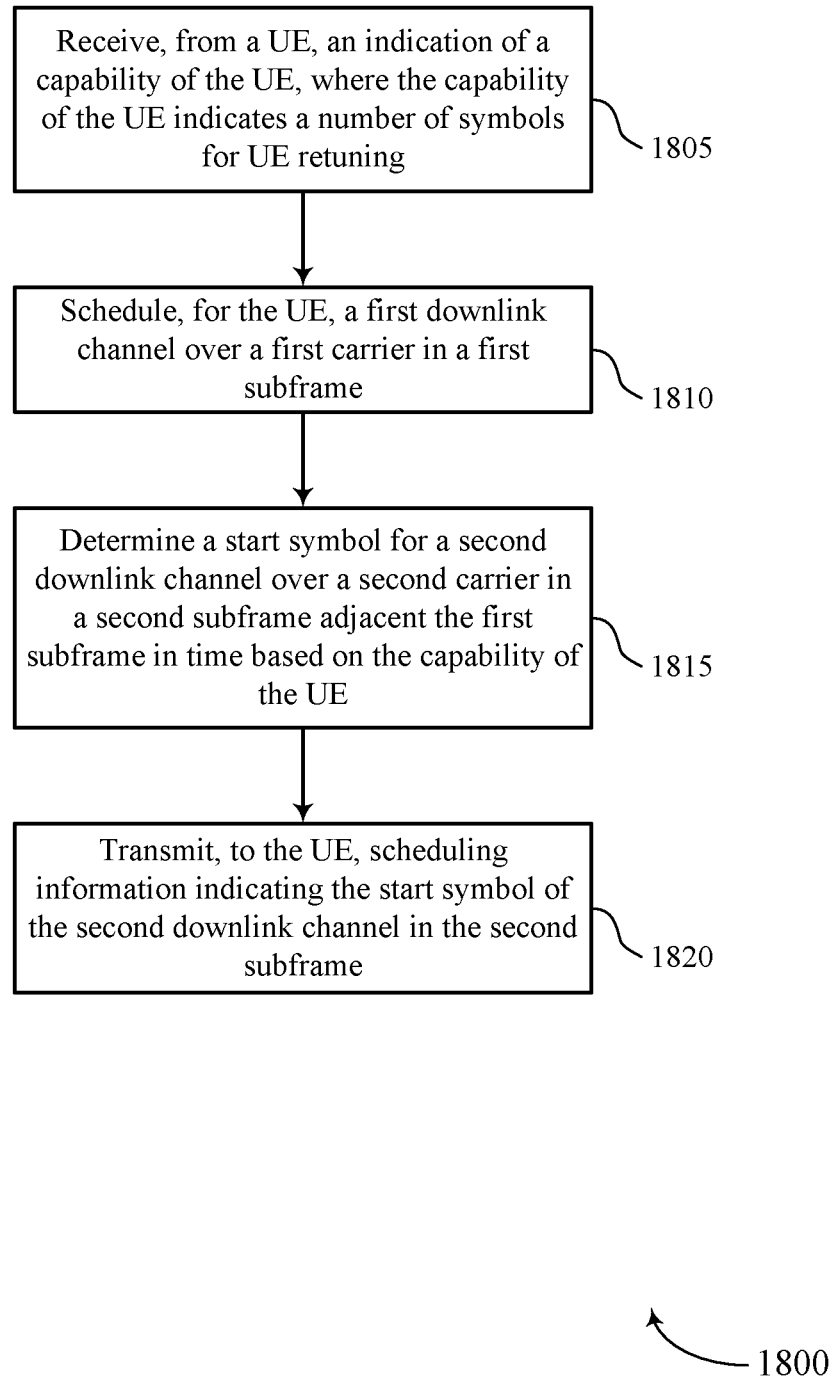

FIG. 18 shows a flowchart illustrating a method 1800 that supports narrowband retuning in wireless communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a UE, an indication of a capability of the UE, where the capability of the UE indicates a number of symbols for UE retuning. The operations of 1805 may be performed according to the methods described herein. In some examples, aspects of the operations of 1805 may be performed by a capability receiver as described with reference to FIGS. 11 through 14.

At 1810, the base station may schedule, for the UE, a first downlink channel over a first carrier in a first subframe. The operations of 1810 may be performed according to the methods described herein. In some examples, aspects of the operations of 1810 may be performed by a scheduler as described with reference to FIGS. 11 through 14.

At 1815, the base station may determine a start symbol for a second downlink channel over a second carrier in a second subframe adjacent the first subframe in time based on the capability of the UE. The operations of 1815 may be performed according to the methods described herein. In some examples, aspects of the operations of 1815 may be performed by a start time manager as described with reference to FIGS. 11 through 14.

At 1820, the base station may transmit, to the UE, scheduling information indicating the start symbol of the second downlink channel in the second subframe. The operations of 1820 may be performed according to the methods described herein. In some examples, aspects of the operations of 1820 may be performed by a scheduling information transmitter as described with reference to FIGS. 11 through 14.

Figure 19:
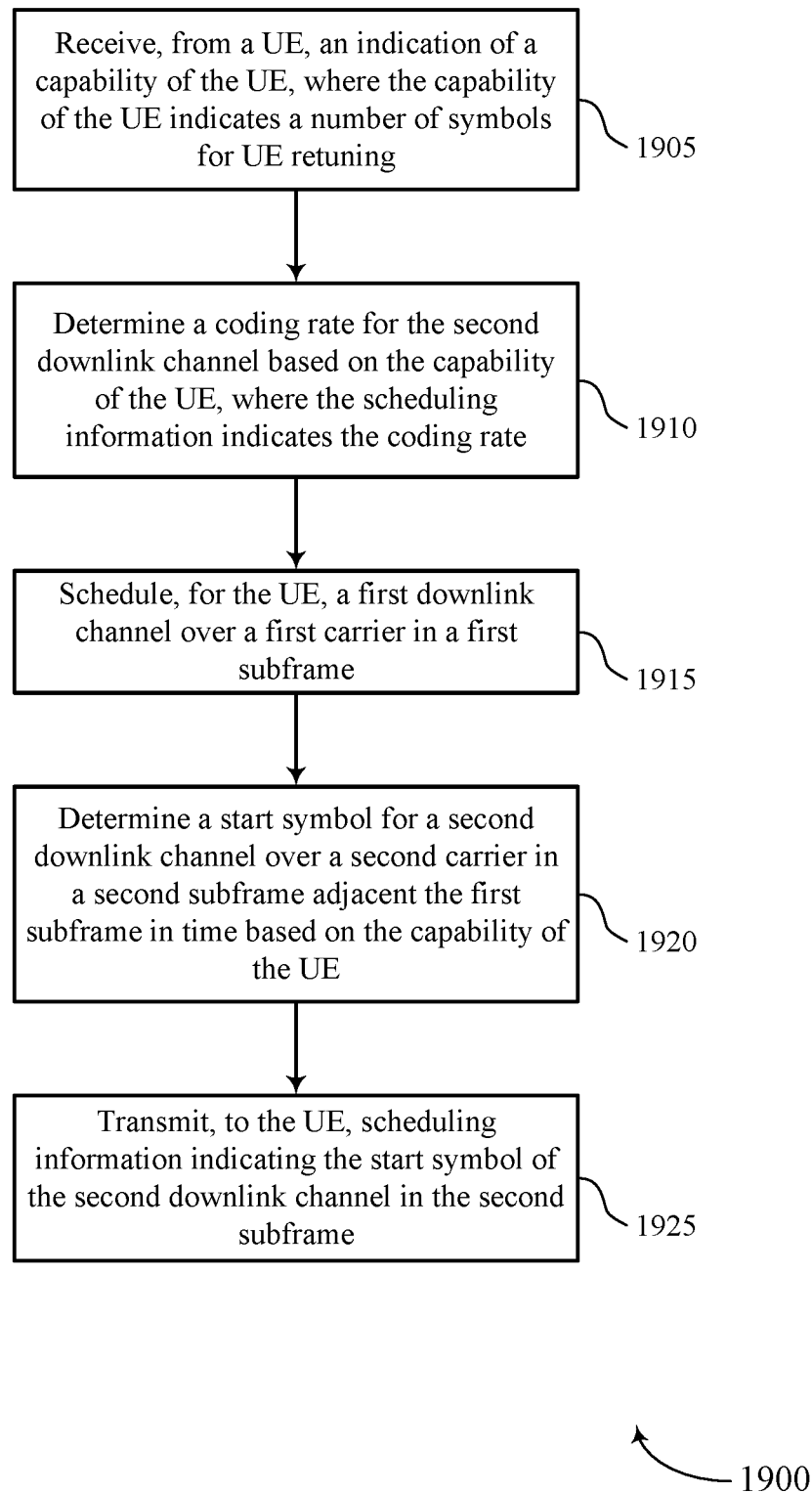

FIG. 19 shows a flowchart illustrating a method 1900 that supports narrowband retuning in wireless communications in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a UE, an indication of a capability of the UE, where the capability of the UE indicates a number of symbols for UE retuning. The operations of 1905 may be performed according to the methods described herein. In some examples, aspects of the operations of 1905 may be performed by a capability receiver as described with reference to FIGS. 11 through 14.

At 1910, the base station may determine a coding rate for the second downlink channel based on the capability of the UE, where the scheduling information indicates the coding rate. The operations of 1910 may be performed according to the methods described herein. In some examples, aspects of the operations of 1910 may be performed by a capability receiver as described with reference to FIGS. 11 through 14.

At 1915, the base station may schedule, for the UE, a first downlink channel over a first carrier in a first subframe. The operations of 1915 may be performed according to the methods described herein. In some examples, aspects of the operations of 1915 may be performed by a scheduler as described with reference to FIGS. 11 through 14.

At 1920, the base station may determine a start symbol for a second downlink channel over a second carrier in a second subframe adjacent the first subframe in time based on the capability of the UE. The operations of 1920 may be performed according to the methods described herein. In some examples, aspects of the operations of 1920 may be performed by a start time manager as described with reference to FIGS. 11 through 14.

At 1925, the base station may transmit, to the UE, scheduling information indicating the start symbol of the second downlink channel in the second subframe. The operations of 1925 may be performed according to the methods described herein. In some examples, aspects of the operations of 1925 may be performed by a scheduling information transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A"

may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, over a first carrier, a first downlink channel communication in a first subframe;
    identifying a second carrier and a start symbol for a second downlink channel communication in a second subframe adjacent the first subframe in time;
    determining a start time to perform retuning from the first carrier to the second carrier based at least in part on a capability of the UE and the start symbol for the second downlink channel communication;
    retuning from the first carrier to the second carrier at the start time; and
    monitoring the second carrier for the second downlink channel communication after retuning.

2. The method of claim 1, further comprising:
    determining the start time to perform retuning based at least in part on a number of symbols for UE retuning, a number of antenna ports configured for the UE, or any combination thereof.

3. The method of claim 2, further comprising:
    determining the number of symbols for UE retuning based at least in part on the capability of the UE.

4. The method of claim 2, further comprising:
    determining the start time to perform retuning based at least in part on a hybrid automatic repeat request (HARD) identifier (ID), a retransmission number, an effective coding rate for the first downlink channel communication or the second downlink channel communication, a signal to noise ratio, a Doppler effect, a channel type of the first downlink channel communication or the second downlink channel communication, or any combination thereof.

5. The method of claim 1, further comprising:
    retuning from the first carrier to the second carrier prior to the start symbol for the second downlink channel communication.

6. The method of claim 1, further comprising:
    receiving a reference signal in an initial symbol of the second subframe; and
    retuning from the first carrier to the second carrier after reception of the reference signal.

7. The method of claim 6, further comprising:
    performing a channel interpolation for one or more symbols before the initial symbol using the received reference signal.

8. The method of claim 1, wherein:
    retuning is performed during one or more symbols and the one or more symbols are located in the first subframe.

9. The method of claim 1, wherein:
    retuning is performed during one or more symbols and the one or more symbols are located in the second subframe.

10. The method of claim 1, wherein:
    retuning is performed during one or more symbols and the one or more symbols span at least a portion of both the first subframe and the second subframe.

11. The method of claim 1, further comprising:
    determining to puncture at least one symbol of the first subframe or the second subframe to perform retuning based at least in part on the capability of the UE and the start symbol of the second downlink channel communication.

12. The method of claim 11, further comprising:
    determining the at least one symbol based at least in part on a code rate or a retransmission identifier associated with the second downlink channel communication.

13. The method of claim 1, further comprising:
    retuning from the first carrier to the second carrier at a boundary between two symbols in the second subframe.

14. The method of claim 1, further comprising:
    receiving, from a base station, the second downlink channel communication in the second subframe over the second carrier after retuning based at least in part on the monitoring.

15. The method of claim 1, further comprising:
    transmitting, to a base station, an indication of the capability of the UE.

16. The method of claim 1, wherein one or both of the first carrier and the second carrier is a narrowband carrier.

17. The method of claim 1, wherein the first downlink channel communication and the second downlink channel communication are downlink shared channel communications, downlink control channel communications, or any combination thereof.

18. A method for wireless communications at a base station, comprising:
    receiving, from a user equipment (UE), an indication of a capability of the UE, wherein the capability of the UE indicates a number of symbols for UE retuning;
    scheduling, for the UE, a first downlink channel over a first carrier in a first subframe;

determining a start symbol for a second downlink channel over a second carrier in a second subframe adjacent the first subframe in time based at least in part on the capability of the UE; and transmitting, to the UE, scheduling information indicating the start symbol of the second downlink channel in the second subframe.

19. The method of claim 18, further comprising:
determining a coding rate for the second downlink channel based at least in part on the capability of the UE, wherein the scheduling information indicates the coding rate.

20. The method of claim 18, further comprising:
transmitting, over the first carrier, the first downlink channel in the first subframe.

21. The method of claim 18, further comprising:
transmitting, over the second carrier, the second downlink channel in the second subframe.

22. The method of claim 18, wherein one or both of the first carrier and the second carrier is a narrowband carrier.

23. An apparatus for wireless communications at a user equipment (UE), comprising: a processor, memory coupled with the processor; and instructions stored in the memory and executable by the processor to cause the apparatus to:
receive, over a first carrier, a first downlink channel communication in a first subframe;
identify a second carrier and a start symbol for a second downlink channel communication in a second subframe adjacent the first subframe in time;
determine a start time to perform retuning from the first carrier to the second carrier based at least in part on a capability of the UE and the start symbol for the second downlink channel communication;
retune from the first carrier to the second carrier at the start time; and
monitor the second carrier for the second downlink channel communication after retuning.

24. The apparatus of claim 23, wherein the instructions are further executable by the processor to cause the apparatus to:
determine the start time to perform retuning based at least in part on a number of symbols for UE retuning, a number of antenna ports configured for the UE, or any combination thereof.

25. The apparatus of claim 24, wherein the instructions are further executable by the processor to cause the apparatus to:
determine the number of symbols for UE retuning based at least in part on the capability of the UE.

26. The apparatus of claim 24, wherein the instructions are further executable by the processor to cause the apparatus to:
determine the start time to perform retuning based at least in part on a hybrid automatic repeat request (HARD) identifier (ID), a retransmission number, an effective coding rate for the first downlink channel communication or the second downlink channel communication, a signal to noise ratio, a Doppler effect, a channel type of the first downlink channel communication or the second downlink channel communication, or any combination thereof.

27. The apparatus of claim 23, wherein the instructions are further executable by the processor to cause the apparatus to:
retune from the first carrier to the second carrier prior to the start symbol for the second downlink channel communication.

28. The apparatus of claim 23, wherein the instructions are further executable by the processor to cause the apparatus to:
receive a reference signal in an initial symbol of the second subframe; and
retune from the first carrier to the second carrier after reception of the reference signal.

29. The apparatus of claim 28, wherein the instructions are further executable by the processor to cause the apparatus to:
perform a channel interpolation for one or more symbols before the initial symbol using the received reference signal.

30. An apparatus for wireless communications at a base station, comprising: a processor, memory coupled with the processor; and instructions stored in the memory and executable by the processor to cause the apparatus to:
receive, from a user equipment (UE), an indication of a capability of the UE, wherein the capability of the UE indicates a number of symbols for UE retuning;
schedule, for the UE, a first downlink channel over a first carrier in a first subframe;
determine a start symbol for a second downlink channel over a second carrier in a second subframe adjacent the first subframe in time based at least in part on the capability of the UE; and
transmit, to the UE, scheduling information indicating the start symbol of the second downlink channel in the second subframe.

\* \* \* \* \*